US012658145B2

(12) United States Patent
Kim et al.

(10) Patent No.: US 12,658,145 B2
(45) Date of Patent: Jun. 16, 2026

(54) DISPLAY DEVICE AND ELECTRONIC DEVICE INCLUDING THE SAME

(71) Applicant: SAMSUNG DISPLAY CO., LTD., Yongin-si (KR)

(72) Inventors: Huisu Kim, Yongin-si (KR); Jae-Seob Chung, Yongin-si (KR); Seyun Kim, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 19/095,731

(22) Filed: Mar. 31, 2025

(65) Prior Publication Data

US 2025/0378795 A1 Dec. 11, 2025

(30) Foreign Application Priority Data

Jun. 7, 2024 (KR) ........................ 10-2024-0074479

(51) Int. Cl.
*G09G 3/3275* (2016.01)
*G09G 3/32* (2016.01)

(52) U.S. Cl.
CPC ............. *G09G 3/3275* (2013.01); *G09G 3/32* (2013.01); *G09G 2300/0452* (2013.01); *G09G 2310/0275* (2013.01); *G09G 2320/0247* (2013.01); *G09G 2320/0257* (2013.01); *G09G 2320/0276* (2013.01); *G09G 2330/021* (2013.01)

(58) Field of Classification Search
CPC .................................................. G09G 2360/16
See application file for complete search history.

(56) References Cited

U.S. PATENT DOCUMENTS

| | | | | |
|---|---|---|---|---|
| 8,427,515 | B2 | 4/2013 | Kim et al. | |
| 2004/0113873 | A1* | 6/2004 | Shirasaki | G09G 3/325 345/76 |
| 2013/0127923 | A1* | 5/2013 | An | G09G 3/3233 345/690 |
| 2016/0225305 | A1* | 8/2016 | Song | G09G 3/2055 |
| 2018/0025683 | A1* | 1/2018 | Oh | G09G 3/3233 345/690 |

FOREIGN PATENT DOCUMENTS

| | | |
|---|---|---|
| KR | 10-2008-0050675 A | 6/2008 |

* cited by examiner

*Primary Examiner* — Nan-Ying Yang
(74) *Attorney, Agent, or Firm* — F. CHAU & ASSOCIATES, LLC

(57) ABSTRACT

A display device includes a driving controller, a source driving circuit, and a display panel. The driving controller compares a target grayscale within a dithering area to a predetermined reference grayscale and outputs image data using the reference grayscale and dithering maps when the target grayscale is below the reference. This controller also applies an offset grayscale to a first grayscale area, previously showing a black grayscale, and either the black or reference grayscale to a second area, previously showing the reference grayscale, in the current frame. The offset grayscale is set between the black and reference grayscales. The source driving circuit converts this image data into data signals, which the display panel then receives and uses to display the image.

20 Claims, 24 Drawing Sheets

<Fk-1>

<Fk>

<Fk>

<Fk+1>

<Fk>

<Fk-1>

<Fk>

<Fk-1>

<Fk-1>

<Fk>

DISPLAY DEVICE AND ELECTRONIC DEVICE INCLUDING THE SAME

CROSS-REFERENCE TO RELATED APPLICATIONS

This U.S. patent application claims priority under 35 U.S.C. § 119 to Korean Patent Application No. 10-2024-0074479 filed on Jun. 7, 2024, in the Korean Intellectual Property Office, the disclosure of which is incorporated by reference in its entirety herein.

1. Technical Field

Embodiments of the present disclosure described herein relate to a display device and an electronic device including the same.

2. Discussion of Related Art

A light emitting display device displays an image by using a light emitting diode that generates light through the recombination of electrons and holes. The light emitting display device is driven with low power while providing a fast response speed.

The light emitting display device includes a display panel equipped with pixels that are connected to data lines and scan lines. Typically, each pixel includes a light emitting diode (LED), and a pixel circuit unit for controlling the amount of current flowing to the LED. The pixel circuit unit adjusts the amount of current flowing through the LED in response to a data signal, thereby controlling the luminance of the light produced by the LED based on the amount of current it receives.

In low-grayscale areas of the display panel, there's a higher propensity for visual artifacts such as stains and discoloration. These issues can detract from the quality of the image, making it appear less clear, vibrant, or accurate. Further, when pixels switch from an off state (no light emission) to an on state (light emission), such transitions can result in overshooting. This occurs when the brightness of the pixel exceeds the intended luminance, potentially causing visual disturbances. Mixed color conditions occur when the red, green, and blue components of a pixel in a display do not match in intensity, leading to various challenges in color consistency and management. This disparity can cause visual artifacts such as color banding, where smooth gradients are replaced by noticeable bands, and can complicate color calibration across different devices, affecting visual accuracy and increasing processing demands.

SUMMARY

Embodiments of the present disclosure provide a display device with enhanced display quality by preventing phenomena such as stains and discoloration from occurring in a low-grayscale display area, and an electronic device including the same.

According to an embodiment, a display device includes a driving controller, a source driving circuit, and a display panel. The driving controller compares a target grayscale of a dithering area within image data with a predetermined reference grayscale, adjusts the image data using the reference grayscale and dithering maps when a result of the compare indicates the target grayscale is lower than the reference grayscale, applies an offset grayscale to a first grayscale area during a current frame, which displayed a black grayscale in a previous frame, wherein the offset grayscale is lower than the reference grayscale and higher than the black grayscale, and applies the black grayscale or the reference grayscale to a second grayscale area during the current frame, which displayed the reference grayscale during the previous frame. The source driving circuit converts the image data into data signals, and the display panel receives the data signals to display an image.

According to an embodiment, a display device includes a driving controller to receive image data and output adjusted image data, a source driving circuit that converts the adjusted image data into data signals, and a display panel that receives the data signals to display an image.

The driving controller compares a target grayscale of a dithering area within the image data with a first reference grayscale and a predetermined second reference grayscale, adjusts the image data using the first reference grayscale and first dithering maps, when a result of the compare indicates the target grayscale is lower than the first reference grayscale. The driving controller adjusts the image data using the first reference grayscale, the second reference grayscale, and second dithering maps when a result of the compare indicates the target grayscale is higher than or equal to the first reference grayscale and lower than or equal to the second reference grayscale.

According to an embodiment, an electronic device includes a driving controller, a source driving circuit, a display panel, and a processor. The driving controller receives image data, compares a target grayscale of a dithering area within the image data with a reference grayscale, adjusts the image data using the reference grayscale and dithering maps when a result of the compare indicates the target grayscale is lower than the reference grayscale, applies an offset grayscale to a first grayscale area during a current frame, which expresses a black grayscale during a previous frame, wherein the offset grayscale is lower than the reference grayscale and higher than the black grayscale, and applies the black grayscale or the reference grayscale to a second grayscale area during the current frame, which expresses the reference grayscale during the previous frame. The source driving circuit converts the image data into data signals, and the display panel receives the data signals to display an image. The processor provides the image data to the driving controller.

BRIEF DESCRIPTION OF THE FIGURES

The above and other objects and features of the present disclosure will become apparent by describing in detail embodiments thereof with reference to the accompanying drawings.

DETAILED DESCRIPTION

Figure 1:
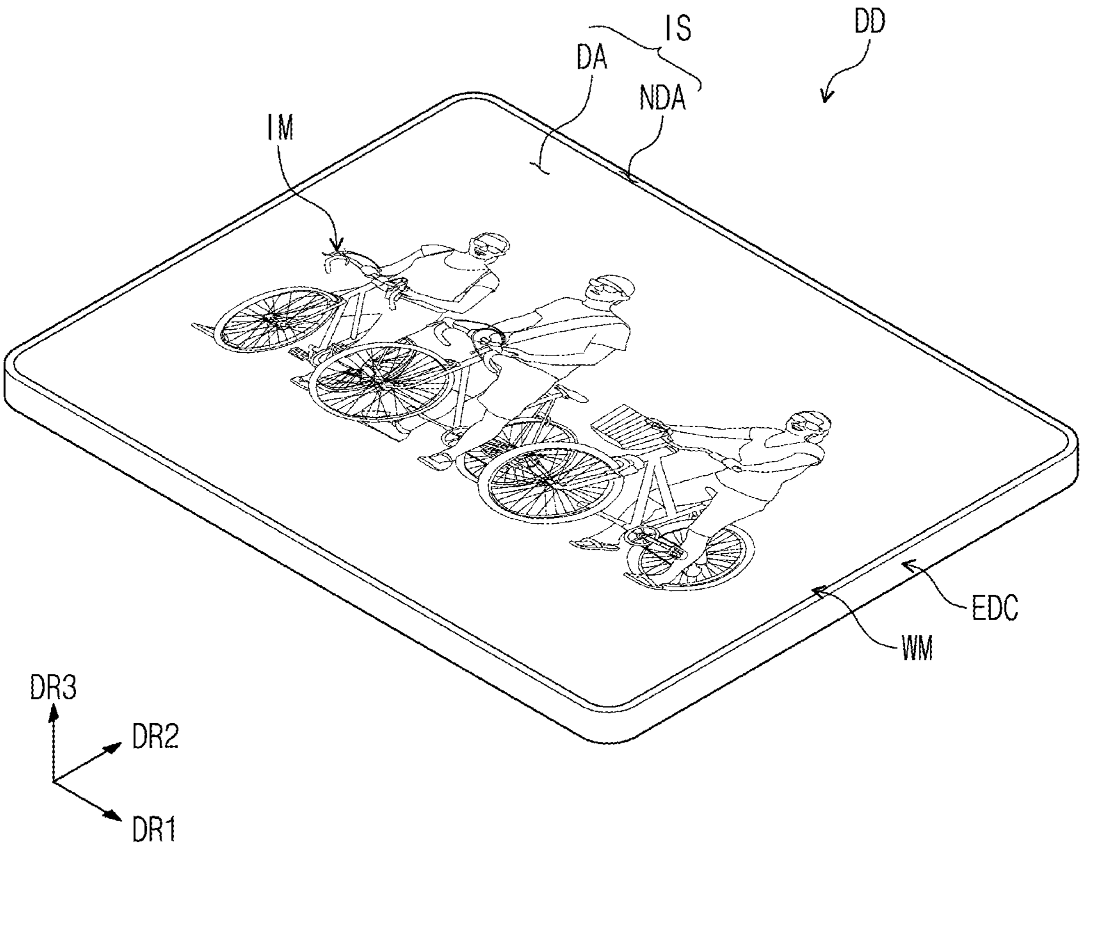
FIG. 1 is a perspective view of a display device, according to an embodiment of the present disclosure.

In the specification, the expression that a first component (or region, layer, part, portion, etc.) is "on", "connected with", or "coupled with" a second component means that the first component is directly on, connected with, or coupled with the second component or means that a third component is interposed therebetween.

The same reference numerals refer to the same components. The term "and/or" includes one or more combinations in each of which associated elements are defined.

Although the terms "first", "second", etc. may be used to describe various components, the components should not be construed as being limited by the terms. The terms are only used to distinguish one component from another component. For example, without departing from the scope and spirit of the present disclosure, a first component may be referred to as a second component, and similarly, the second component may be referred to as the first component. The articles "a," "an," and "the" are singular in that they have a single referent, but the use of the singular form in the specification should not preclude the presence of more than one referent.

Also, the terms "under", "below", "on", "above", etc. are used to describe the correlation of components illustrated in drawings. The terms that are relative in concept are described based on a direction shown in drawings.

It will be understood that the terms "include", "comprise", "have", etc. specify the presence of features, numbers, steps, operations, elements, or components, described in the specification, or a combination thereof, not precluding the presence or additional possibility of one or more other features, numbers, steps, operations, elements, or components or a combination thereof.

Hereinafter, embodiments of the present disclosure will be described with reference to accompanying drawings.

Figure 2:
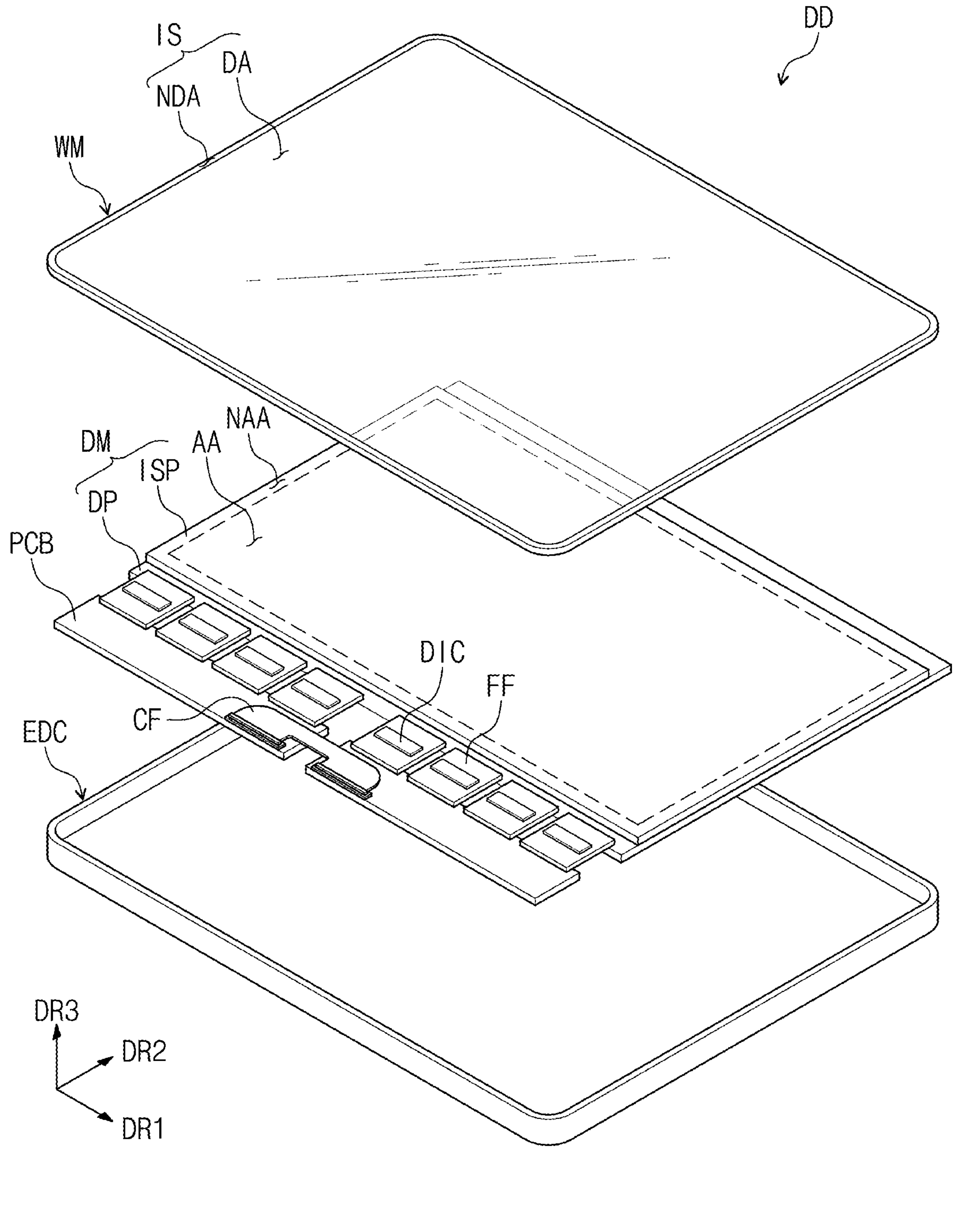
FIG. 2 is an exploded perspective view of a display device, according to an embodiment of the present disclosure.

FIG. 1 is a perspective view of a display device, according to an embodiment of the present disclosure. FIG. 2 is an exploded perspective view of a display device, according to an embodiment of the present disclosure.

Referring to FIGS. 1 and 2, a display device DD may be a device activated depending on an electrical signal. The display device DD according to an embodiment of the present disclosure may be a small and medium-sized electronic device, such as a mobile phone, a tablet personal computer (PC), a notebook computer, a vehicle navigation system, or a game console, as well as a large-sized electronic device, such as a television or a monitor. The examples provided are for illustration only, and it is clear that the display device DD may be implemented in various other forms without departing from the concept of the present disclosure. The display device DD has a rectangular shape with a long side in a first direction DR1 and a short side in a second direction DR2 intersecting the first direction DR1. However, the shape of the display device DD is not limited thereto. For example, the display device DD may be implemented in various shapes. The display device DD may display an image IM on a display surface IS, which is parallel to each of the first direction DR1 and the second direction DR2, in a third direction DR3. The display surface IS on which the image IM is displayed may correspond to a front surface of the display device DD.

In an embodiment, a front surface (or an upper/top surface) and a rear surface (or a lower/bottom surface) of each member are defined based on a direction in which the image IM is displayed. The front surface may be opposite to the rear surface in the third direction DR3, and a normal direction of each of the front surface and the rear surface may be parallel to the third direction DR3.

A separation distance between the front surface and the rear surface in the third direction DR3 may correspond to a thickness of the display device DD in the third direction DR3. Meanwhile, directions that the first, second, and third directions DR1, DR2, and DR3 indicate may be relative concepts and may be changed to different directions.

The display device DD may sense an external input applied from the outside. The external input may include various types of inputs that are provided from the outside of the display device DD. The display device DD according to an embodiment of the present disclosure may sense an external input of a user, which is applied from the outside. The external input of the user may be one of various types of external inputs, such as a part of the body, light, heat, gaze, and pressure, or a combination thereof. Also, the display device DD may sense the external input of the user applied to a side surface or a rear surface of the display device DD depending on its structure design, although this capability is not confined to any specific embodiment. As an example of the present disclosure, an external input may include an input entered through an input device (e.g., a stylus pen, an active pen, a touch pen, an electronic pen, or an E-pen).

The display surface IS of the display device DD may be divided into a display area DA and a non-display area NDA. The display area DA may be an area in which the image IM is displayed. A user perceives (or views) the image IM through the display area DA. In an embodiment, the display area DA is depicted as a quadrangle with rounded vertexes. However, this is just one illustration. The display area DA may have various shapes and is not restricted to any particular embodiment.

The non-display area NDA is adjacent to the display area DA. The non-display area NDA may have a given color. The non-display area NDA may surround the display area DA. Accordingly, a shape of the display area DA may be defined substantially by the non-display area NDA. However, this depiction is merely an example. For example, the non-display area NDA may be positioned to be adjacent to only one side of the display area DA or may be omitted. The display device DD according to an embodiment of the present disclosure may be realized in various forms and is not limited to any single embodiment.

As illustrated in FIG. 2, the display device DD may include a display module DM and a window WM disposed on the display module DM. The display module DM may include a display panel DP and an input sensing layer ISP.

According to an embodiment of the present disclosure, the display panel DP may include a light emitting display panel. For example, the display panel DP may be an organic light emitting display panel, an inorganic light emitting display panel, or a quantum dot light emitting display panel. A light emitting layer of the organic light emitting display panel may include an organic light emitting material. A light emitting layer of the inorganic light emitting display panel may include an inorganic light emitting material. A light emitting layer of the quantum dot light emitting display panel may include a quantum dot, a quantum rod, or the like.

The display panel DP may output the image IM, which is then displayed on the display surface IS.

The input sensing layer ISP may be disposed on the display panel DP to sense an external input. The input sensing layer ISP may be directly disposed on the display panel DP. According to an embodiment of the present disclosure, the input sensing layer ISP may be formed on the display panel DP by a subsequent process. When the input sensing layer ISP is formed directly on the display panel DP, there is no inner adhesive film interposed between the input sensing layer ISP and the display panel DP. However, the inner adhesive film may be interposed between the input sensing layer ISP and the display panel DP. In this case, the input sensing layer ISP is not manufactured together with the display panel DP through the subsequent processes. That is, the input sensing layer ISP may be manufactured through a process separate from that of the display panel DP and may then be fixed on an upper surface of the display panel DP by the inner adhesive film.

The window WM may be formed of a transparent material capable of outputting the image IM. For example, the window WM may be formed of glass, sapphire, plastic, etc. While the window WM is illustrated with a single layer, embodiments of the inventive concept are not limited thereto. For example, the window WM may include a plurality of layers.

Meanwhile, the non-display area NDA of the display device DD described above may be defined as an area where a material of a specific color is printed onto a section of the window WM. As an example of the present disclosure, the window WM may include a light blocking pattern for defining the non-display area NDA. For example, the light blocking pattern, which may be a colored organic film, may be formed through a coating process.

The window WM may be coupled to the display module DM through an adhesive film. As an example of the present disclosure, the adhesive film may include an optically clear adhesive (OCA) film. However, the adhesive film is not limited thereto. For example, the adhesive film may include an adhesive or sticking agent. For example, the adhesive film may include an optically clear resin (OCR) or a pressure sensitive adhesive (PSA) film.

An anti-reflection layer may be further interposed between the window WM and the display module DM. The anti-reflection layer decreases the reflectivity of external light incident from above the window WM. The anti-reflection layer according to an embodiment of the present disclosure may include a phase retarder and a polarizer. The phase retarder may be either a film type or a liquid crystal coating type, incorporating either a 2/2 phase retarder or a $\lambda/4$ phase retarder. The polarizer may also be either a film type or a liquid crystal coating type. The film type may include a stretch-type synthetic resin film, and the liquid crystal coating type may include liquid crystals arranged in a given direction. The phase retarder and the polarizer may be implemented with one polarization film.

As an example of the present disclosure, the anti-reflection layer may also include color filters. The arrangement of the color filters may be determined in consideration of colors of light generated from a plurality of pixels PX (see FIG. 3) included in the display panel DP. In this case, the anti-reflection layer may further include a light blocking pattern disposed between the color filters.

The display module DM may display the image IM depending on its electrical signal and is capable of transmitting and receiving information about an external input. The display module DM may be defined by an active area AA and an inactive area NAA. The active area AA may be defined as an area (i.e., an area where the image IM is displayed) through which the image IM is output from the display panel DP. Also, the active area AA may be defined as an area in which the input sensing layer ISP senses an external input applied from the outside. According to an embodiment, the active area AA of the display module DM may correspond to (or overlap) at least part of the display area DA.

The inactive area NAA is adjacent to the active area AA. The inactive area NAA may be an area in which the image IM is not substantially displayed. For example, the inactive area NAA may surround the active area AA. However, this is illustrated by way of example. The inactive area NAA may have various shapes, and is not limited to any particular embodiment. According to an embodiment, the inactive area NAA of the display module DM may correspond to (or overlap) at least part of the non-display area NDA.

The display device DD may further include a plurality of flexible films FF connected to the display panel DP. A driver chip DIC may be mounted on each of the flexible films FF. As an example of the present disclosure, a source driving circuit 200 (see FIG. 3) may include the plurality of driver chips DIC, and the plurality of driver chips DIC may be respectively mounted on the plurality of flexible films FF.

The display device DD may further include at least one circuit board PCB coupled to the plurality of flexible films FF. As an example of the present disclosure, the two circuit boards PCB are provided in the display device DD, but the number of the circuit boards PCB is not limited thereto. Two adjacent circuit boards among the circuit boards PCB may be electrically connected to each other by a connection film CF. Also, at least one of the circuit boards PCB may be electrically connected to a main board. A driving controller 100 (see FIG. 3) and a voltage generator 400 (see FIG. 3) may be disposed on at least one of the circuit boards PCB.

FIG. 2 illustrates a structure in which the driver chips DIC are respectively mounted on the flexible films FF, but the present disclosure is not limited thereto. For example, the driver chips DIC may be directly mounted on the display panel DP. In this case, a portion of the display panel DP, on which the driver chip DIC is mounted, may be bent such that the driver chip DIC is disposed on a rear surface of the display module DM.

The input sensing layer ISP may be electrically connected to the circuit board PCB through the flexible films FF. However, embodiments of the present disclosure are not limited thereto. That is, the display module DM may additionally include a separate flexible film for electrically connecting the input sensing layer ISP and the circuit board PCB.

The display device DD further includes a housing EDC for accommodating the display module DM. The housing EDC may be coupled with the window WM to define the exterior appearance of the display device DD. The housing EDC may absorb external shocks and may prevent the intrusion of a foreign material or moisture into the display module DM, thereby safeguarding the components contained within the housing EDC. Meanwhile, as an example of the present disclosure, the housing EDC may be provided in the form of a combination of a plurality of accommodating members.

The display device DD according to an embodiment may further include an electronic module including various functional modules for operating the display module DM, a power supply module (e.g., a battery) for supplying a power necessary for overall operations of the display device DD, a bracket coupled with the display module DM and/or the housing EDC to partition an inner space of the display device DD, etc.

Figure 3:
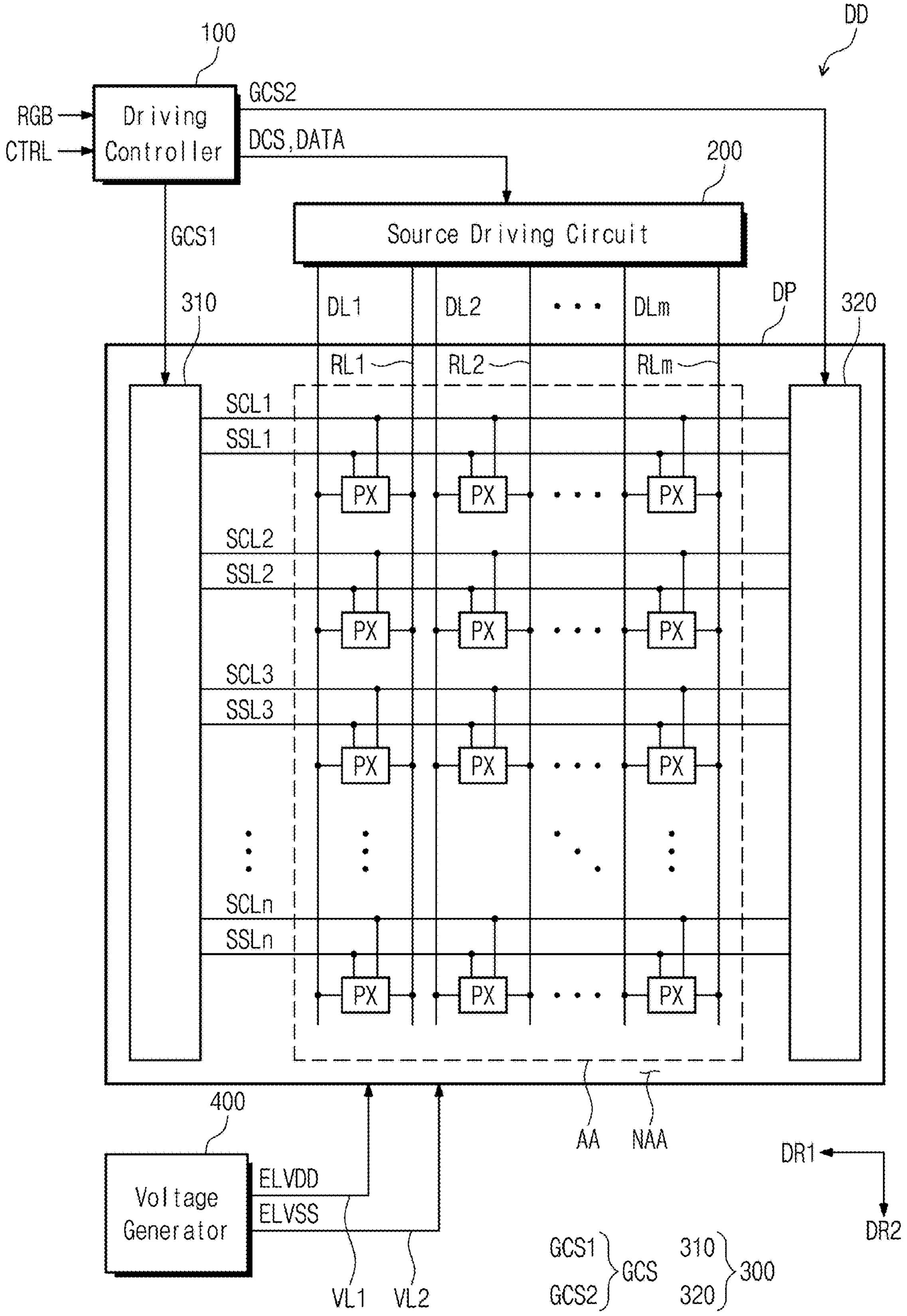
FIG. 3 is a block diagram of a display device, according to an embodiment of the present disclosure.

FIG. 3 is a block diagram of a display device, according to an embodiment of the present disclosure.

Referring to FIG. 3, the display device DD includes a driving controller 100 (e.g., a controller circuit), a source driving circuit 200, a scan driving circuit 300, a voltage generator 400, and a display panel DP. As an example of the present disclosure, the source driving circuit 200 may include a data driver and a sensing driver.

The display panel DP includes driving scan lines SCL1 to SCLn, sensing scan lines SSL1 to SSLn, data lines DL1 to DLm, sensing lines RL1 to RLm, and pixels PX. The display panel DP may be divided into the active area AA and the inactive area NAA. The pixels PX may be positioned in the active area AA. The scan driving circuit 300 may be positioned in the inactive area NAA.

The driving scan lines SCL1 to SCLn and the sensing scan lines SSL1 to SSLn extend in parallel with the first direction DR1 and are arranged spaced from each other in the second direction DR2. The second direction DR2 may be a direction intersecting the first direction DR1. The data lines DL1 to DLm extend from the source driving circuit 200 in parallel with the second direction DR2 and are arranged spaced from each other in the first direction DR1. The sensing lines RL1 to RLm may extend in the second direction DR2 and may be arranged in the first direction DR1. The data lines DL1 to DLm may be connected to a data driver. The sensing lines RL1 to RLm may be connected to a sensing driver.

The plurality of pixels PX may be electrically connected to the driving scan lines SCL1 to SCLn, the sensing scan lines SSL1 to SSLn, the data lines DL1 to DLm, and the sensing lines RL1 to RLm. Each of the plurality of pixels PX may be electrically connected with two scan lines. However, the number of the scan lines connected to each of the pixels PX is not limited thereto. For example, each pixel PX may be electrically connected to one or three scan lines.

Each of the plurality of pixels PX may include a light emitting element and a pixel circuit part for controlling the emission of the light emitting element. The pixel circuit part may include a plurality of transistors and a capacitor. Each of the plurality of pixels PX may output light having a predetermined color. As an example of the present disclosure, the plurality of pixels PX may include a red pixel that outputs red light, a green pixel that outputs green light, and a blue pixel that outputs blue light. The red pixel includes a red light emitting element ED_R (see FIG. 5); the green pixel includes a green light emitting element ED_G (see FIG. 5); and the blue pixel includes a blue light emitting element ED_B (see FIG. 5).

The driving controller 100 receives an input image signal RGB and a control signal CTRL from a main processor (e.g., a microcontroller or a graphics controller). The driving controller 100 may generate image data DATA by converting the input image signal RGB.

The driving controller 100 generates a scan control signal GCS and a source control signal DCS based on a control signal CTRL. The source driving circuit 200 receives the source control signal DCS and the image data DATA from the driving controller 100, and then converts the image data DATA into data signals in response to the source control signal DCS. The source driving circuit 200 outputs data signals to the plurality of data lines DL1 to DLm. The data signals may be analog voltages corresponding to grayscale values of the image data DATA.

The source driving circuit 200 is further connected to the plurality of sensing lines RL1 to RLm. The source driving circuit 200 may further receive a sensing control signal from the driving controller 100, and may sense the characteristics of elements included in each of the pixels PX of the display panel DP in response to a sensing control signal.

As an example of the present disclosure, the source driving circuit 200 may be formed of at least one chip. The source driving circuit 200 may be disposed in the driver chips DIC shown in FIG. 2.

The scan driving circuit 300 receives the scan control signal GCS from the driving controller 100. The scan driving circuit 300 may output scan signals in response to the scan control signal GCS. The scan driving circuit 300 may be built into the display panel DP. When the scan driving circuit 300 is built into the display panel DP, the scan driving circuit 300 may include transistors formed through the same process as a pixel circuit part.

The scan driving circuit 300 may generate a plurality of driving scan signals and a plurality of sensing scan signals in response to the scan control signal GCS. The plurality of driving scan signals are applied to the driving scan lines SCL1 to SCLn. The plurality of sensing scan signals are applied to the sensing scan lines SSL1 to SSLn.

As an example of the present disclosure, the scan driving circuit 300 includes a first scan driving circuit 310 and a second scan driving circuit 320. The first scan driving circuit 310 is disposed on the left side of the active area AA. The second scan driving circuit 320 is disposed on the right side of the active area AA. The first scan driving circuit 310 receives a first scan control signal GCS1 from the driver controller 100, and the second scan driving circuit 320 receives a second scan control signal GCS2 from the driver controller 100. The first scan driving circuit 310 may generate the plurality of driving scan signals and the plurality of sensing scan signals in response to the first scan control signal GCS1. The second scan driving circuit 320 may generate the plurality of driving scan signals and the plurality of sensing scan signals in response to the second scan control signal GCS2.

FIG. 3 shows a structure in which the first and second scan driving circuits 310 and 320 are respectively positioned on the left and right sides of the active area AA, but the present disclosure is not limited thereto. The scan driving circuit 300 may include only one of the first and second scan driving circuits 310 and 320.

Each of the plurality of pixels PX may receive a first driving voltage ELVDD and a second driving voltage ELVSS.

The voltage generator 400 generates voltages necessary to operate the display panel DP. In an embodiment of the present disclosure, the voltage generator 400 generates the first driving voltage ELVDD and the second driving voltage ELVSS, which are necessary for the operation of the display panel DP. The first driving voltage ELVDD and the second driving voltage ELVSS may be provided to the display panel DP through a first driving voltage line VL1 and a second driving voltage line VL2, respectively.

In addition to the first driving voltage ELVDD and the second driving voltage ELVSS, the voltage generator 400 may further generate various voltages (e.g., a gamma reference voltage, a data driving voltage, a gate-on voltage, and a gate-off voltage) necessary for operations of the source driving circuit 200 and the scan driving circuit 300.

Figure 4A:
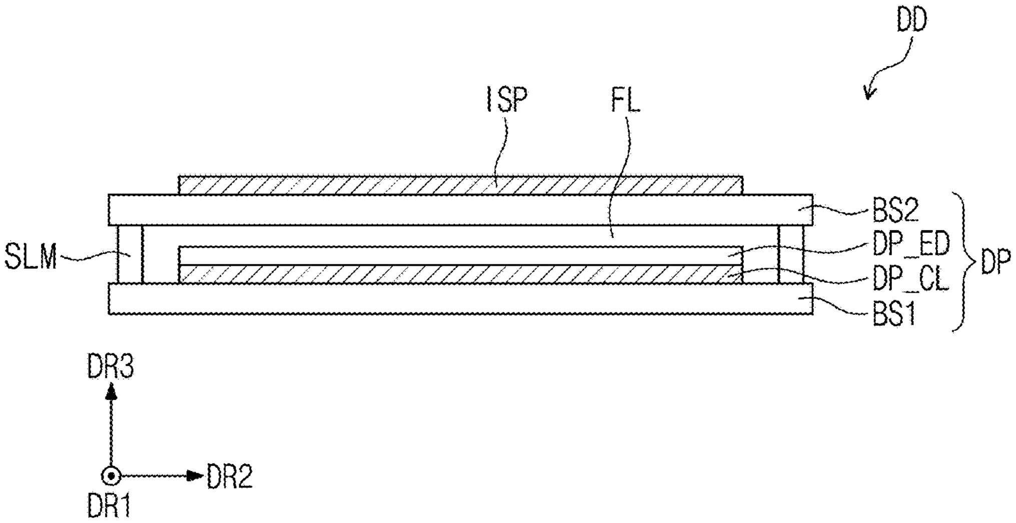
FIG. 4A is a cross-sectional view of a display device, according to an embodiment of the present disclosure.
Figure 4B:
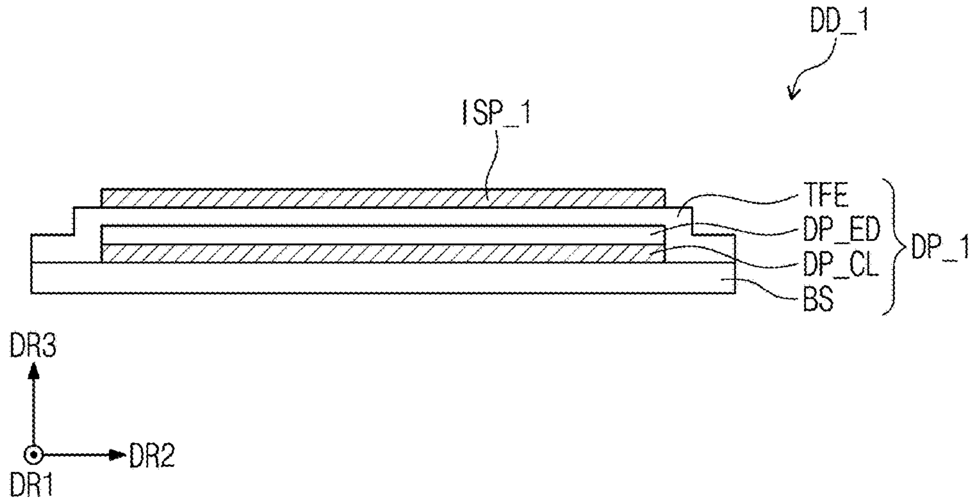
FIG. 4B is a cross-sectional view of a display device, according to an embodiment of the present disclosure.

FIG. 4A is a cross-sectional view of a display device, according to an embodiment of the present disclosure. FIG. 4B is a cross-sectional view of a display device, according to an embodiment of the present disclosure.

Referring to FIG. 4A, the display device DD may include the display panel DP and the input sensing layer ISP. The input sensing layer ISP may be referred to as an "input sensing panel".

The display panel DP may include a first base layer BS1, a display circuit layer DP_CL, a display element layer DP_ED, a second base layer BS2, and a coupling member SLM. The input sensing layer ISP may be placed on the second base layer BS2.

Each of the first base layer BS1 and the second base layer BS2 may be a stacked structure including a silicon substrate, a plastic substrate, a glass substrate, an insulating film, or a plurality of insulating layers.

The display circuit layer DP_CL may be formed on the first base layer BS1. The display circuit layer DP_CL may include a plurality of insulating layers, a plurality of conductive layers, and a semiconductor layer. The plurality of conductive layers of the display circuit layer DP_CL may include signal wires or a control circuit of a pixel.

The display element layer DP_ED may be placed on the display circuit layer DP_CL. The display element layer DP_ED may include light emitting elements. For example, the display element layer DP_ED may include organic light emitting diodes, inorganic light emitting diodes, quantum dots, quantum rods, micro LEDs, or nano LEDs.

The second base layer BS2 may be formed on the display element layer DP_ED. A predetermined space may be defined between the second base layer BS2 and the display element layer DP_ED. The space may be filled with air or inert gas. Furthermore, in an embodiment of the present disclosure, the space may be filled with a filling layer FL such as a silicone-based polymer, an epoxy-based resin, or an acrylic-based resin.

The coupling member SLM may be interposed between the first base layer BS1 and the second base layer BS2. The coupling member SLM may combine the first base layer BS1 and the second base layer BS2. The coupling member SLM may include an organic material such as a photocurable resin or a photoplastic resin, or may include an inorganic material such as a frit seal, but is not limited to any one particular embodiment.

The input sensing layer ISP may include a plurality of insulating layers and a plurality of conductive layers. The plurality of conductive layers may include sensing electrodes that sense an external input, sensing wires electrically connected to the sensing electrodes, and sensing pads electrically connected to the sensing wires.

Referring to FIG. 4B, a display device DD_1 may include a display panel DP_1 and an input sensing layer ISP_1.

The display panel DP_1 may include a base layer BS, the display circuit layer DP_CL, the display element layer DP_ED, and an encapsulation layer TFE. The base layer BS may be of a flexible type. The input sensing layer ISP_1 may be formed on the encapsulation layer TFE. According to an embodiment of the present disclosure, the display panel DP_1 and the input sensing layer ISP_1 may be formed through a subsequent process. That is, the input sensing layer ISP_1 may be formed directly on the encapsulation layer TFE.

Figure 5:
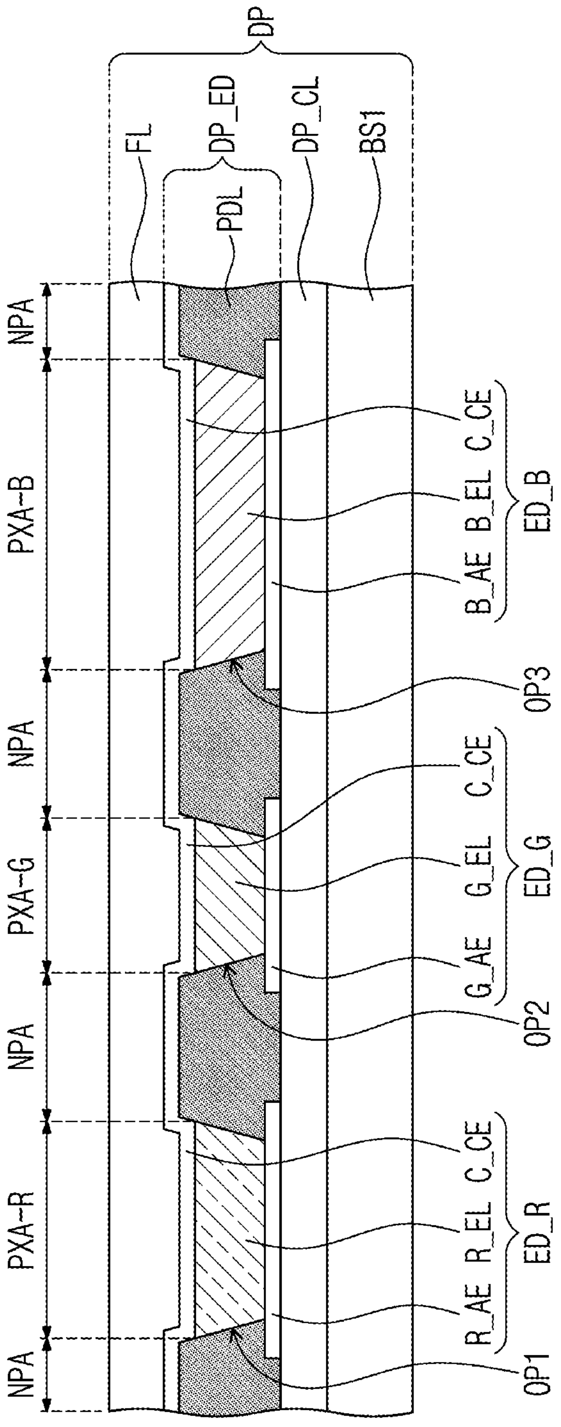
FIG. 5 is an enlarged cross-sectional view of a portion of the display device shown in FIG. 4A.

FIG. 5 is an enlarged cross-sectional view of a portion of the display device shown in FIG. 4A.

Referring to FIG. 5, the display circuit layer DP_CL may be formed on the first base layer BS1. The display circuit layer DP_CL may include a plurality of insulating layers, a plurality of conductive layers, and a semiconductor layer.

The display element layer DP_ED may be formed on the display circuit layer DP_CL. The display element layer DP_ED may include a plurality of light emitting elements. As an example of the present disclosure, the plurality of light emitting elements may include the red light emitting element ED_R, the green light emitting element ED_G, and the blue light emitting element ED_B.

The display element layer DP_ED may include a first electrode layer placed on the display circuit layer DP_CL and a pixel defining layer PDL placed on the first electrode layer. As an example of the present disclosure, the first electrode layer may include a red anode electrode R_AE, a green anode electrode G_AE, and a blue anode electrode B_AE. The red, green, and blue anode electrodes R_AE, G_AE, and B_AE may be defined as first electrodes of red, green, and blue light emitting elements ED_R, ED_G, and ED_B, respectively.

First to third openings OP1, OP2, and OP3 of the pixel defining layer PDL expose at least part of the red, green and blue anode electrodes R_AE, G_AE, and B_AE, respectively. In an embodiment of the present disclosure, the pixel defining layer PDL may further include a black material. The pixel defining layer PDL may further include a black organic dye/pigment such as carbon black or aniline black. The pixel defining layer PDL may be formed by mixing a blue organic material and a black organic material. The pixel defining layer PDL may further include a liquid-repellent organic material.

As illustrated in FIG. 5, the display panel DP may include first to third emission areas PXA-R, PXA-G, and PXA-B and a non-emission area NPA adjacent to the first to third emission areas PXA-R, PXA-G, and PXA-B. The non-emission area NPA may surround the emission areas PXA-R, PXA-G, and PXA-B. The pixel defining layer PDL may be formed in the non-emission area NPA. In an embodiment, the first emission area PXA-R is defined to correspond to a partial area of the red anode electrode R_AE exposed by the first opening OP1. The second emission area PXA-G is defined to correspond to a partial area of the green anode electrode G_AE exposed by the second opening OP2. The third emission area PXA-B is defined to correspond to a partial area of the blue anode electrode B_AE exposed by the third opening OP3.

A light emitting layer may be disposed on the first electrode layer. The light emitting layer may include a red light emitting layer R_EL, a green light emitting layers G_EL, and a blue light emitting layer B_EL. The red, green, and blue light emitting layers R_EL, G_EL, and B_EL may be disposed in areas corresponding to the first to third openings OP1, OP2, and OP3, respectively. The red, green, and blue light emitting layers R_EL, G_EL, and B_EL may be formed separately. Each of the red, green, and blue light emitting layers R_EL, G_EL, and B_EL may include an organic material and/or an inorganic material. The red, green, and blue light emitting layers R_EL, G_EL, and B_EL may generate light of a predetermined color. For example, the red light emitting layer R_EL may generate red light, the green light emitting layer G_EL may generate green light, and the blue light emitting layer B_EL may generate blue light.

In an embodiment, the patterned red, green and blue light emitting layers R_EL, G_EL, and B_EL are provided. However, one light emitting layer may be disposed in the first to third emission areas PXA-R, PXA-G, and PXA-B in common. At this time, the light emitting layer may generate white light or blue light. Also, the light emitting layer may have a multi-layer structure referred to as "tandem".

Each of the red, green, and blue light emitting layers R_EL, G_EL, and B_EL may include a low molecular weight organic material or a high molecular weight organic material as a light emitting material. Alternatively, each of the red, green, and blue light emitting layers R_EL, G_EL, and B_EL may include a quantum dot material as a light emitting material. The core of a quantum dot may be selected from a group II-VI compound, a group III-V compound, a group IV-VI compound, a group IV element, a group IV compound, and any combination thereof.

A second electrode layer is disposed on the red, green and blue light emitting layers R_EL, G_EL, and B_EL. The second electrode layer may include a cathode electrode C_CE. The cathode electrode C_CE is defined as a second electrode of each of the red, green, and blue light emitting elements ED_R, ED_G, and ED_B. The cathode electrode C_CE may be commonly placed in first to third emission areas PXA-R, PXA-G, and PXA-B, and the non-emission areas NPA. That is, the red, green, and blue light emitting elements ED_R, ED_G, and ED_B may share the one cathode electrode C_CE.

The filling layer FL or the encapsulation layer TFE (see FIG. 4B) is formed on the display element layer DP_ED. The filling layer FL includes materials such as a silicone-based polymer, epoxy-based resin, or acrylic-based resin. In the meantime, the encapsulation layer TFE includes at least one inorganic layer or at least one organic layer. In an embodiment of the present disclosure, the encapsulation layer TFE may include two inorganic layers and an organic layer disposed therebetween. In an embodiment of the present disclosure, the thin film encapsulation layer TFE may include a plurality of inorganic layers and a plurality of organic layers, which are alternately stacked. The inorganic layer may include a silicon nitride layer, a silicon oxynitride layer, a silicon oxide layer, a titanium oxide layer, an aluminum oxide layer, or the like, but is not limited thereto. The organic layer may include an acryl-based organic layer, and is not specifically limited thereto.

Figure 6:
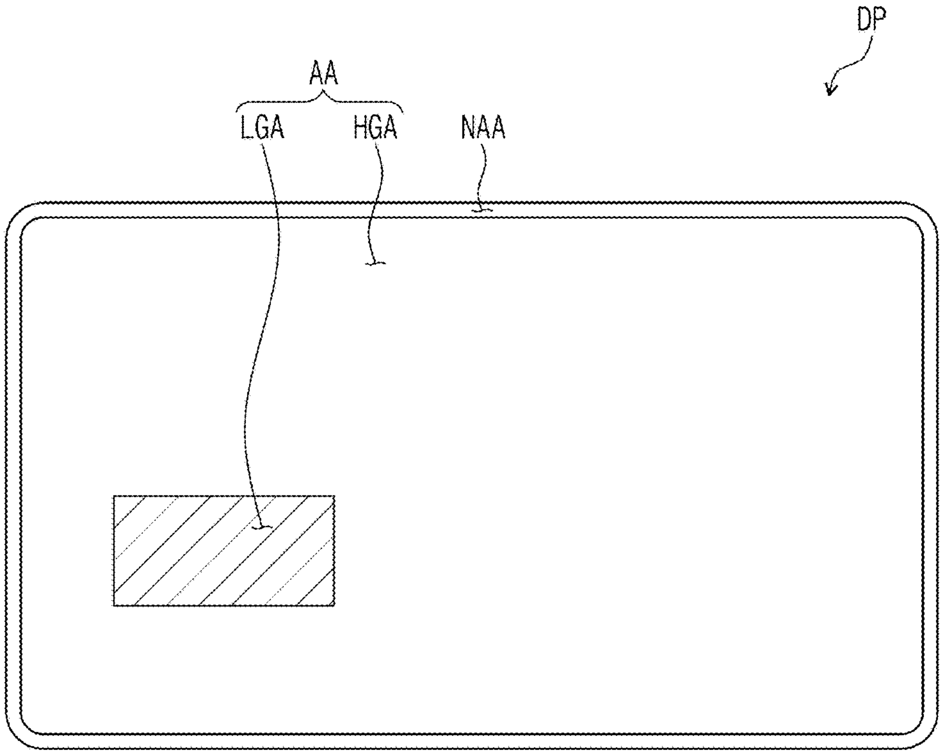
FIG. 6 is a plan view showing a display panel with a low-grayscale display area, according to an embodiment of the present disclosure.
Figure 7:
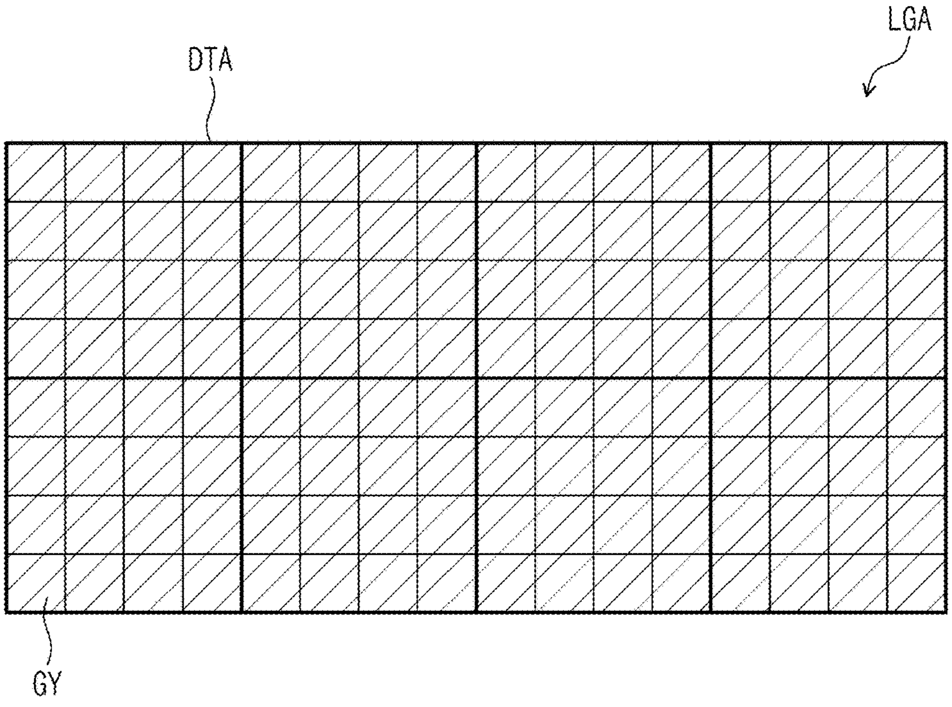
FIG. 7 is a diagram showing a state in which a low-grayscale display area is divided into dithering areas, according to an embodiment of the present disclosure.

FIG. 6 is a plan view showing a display panel with a low-grayscale display area, according to an embodiment of the present disclosure. FIG. 7 is a diagram showing a state in which a low-grayscale display area is divided into dithering areas, according to an embodiment of the present disclosure.

Referring to FIG. 6, the display panel DP includes the active area AA and the inactive area NAA. The active area AA is defined as an area where an image is displayed. The active area AA may be divided into a plurality of areas depending on the characteristics of the displayed image. For example, the active area AA may include a low-grayscale display area LGA that displays a low-grayscale image, and a high-grayscale display area HGA (or referred to as a "non-low-grayscale display area") that displays a high-grayscale image. The low-grayscale display area LGA may be an area where an image with a grayscale lower than or equal to a predetermined reference grayscale is displayed, and the high-grayscale display area HGA may be an area where an image with a grayscale higher than the reference grayscale is displayed.

The low-grayscale display area LGA may be an area vulnerable to stain and discoloration phenomena, and thus, as an example of the present disclosure, the driving controller 100 (see FIG. 3) may perform a dithering processing on the input image signal RGB (see FIG. 3) for the low-grayscale display area LGA, thereby preventing the stain and discoloration phenomena from occurring in the low-grayscale display area LGA.

As illustrated in FIG. 7, the driving controller 100 may divide the low-grayscale display area LGA into a plurality of dithering areas DTA for the dithering processing. FIG. 7 illustrates a case where the low-grayscale display area LGA is divided into eight dithering areas DTA. However, the number of the dithering areas DTA included in the low-grayscale display area LGA may vary depending on the size of the low-grayscale display area LGA.

Each of the plurality of dithering areas DTA may include a plurality of grayscale areas GY. As an example of the present disclosure, each of the plurality of dithering areas DTA may include 4×4 grayscale areas GY arranged in a matrix form (i.e., 16 grayscale areas GY). The number and shape of the grayscale areas GY included in each dithering area DTA are not limited thereto. For example, each dithering area DTA may include 2×2 grayscale areas, 2×4 grayscale areas, or 4×2 grayscale areas. Each of the plurality of grayscale areas GY may be an area expressing a grayscale lower than or equal to the reference grayscale.

Figure 8:
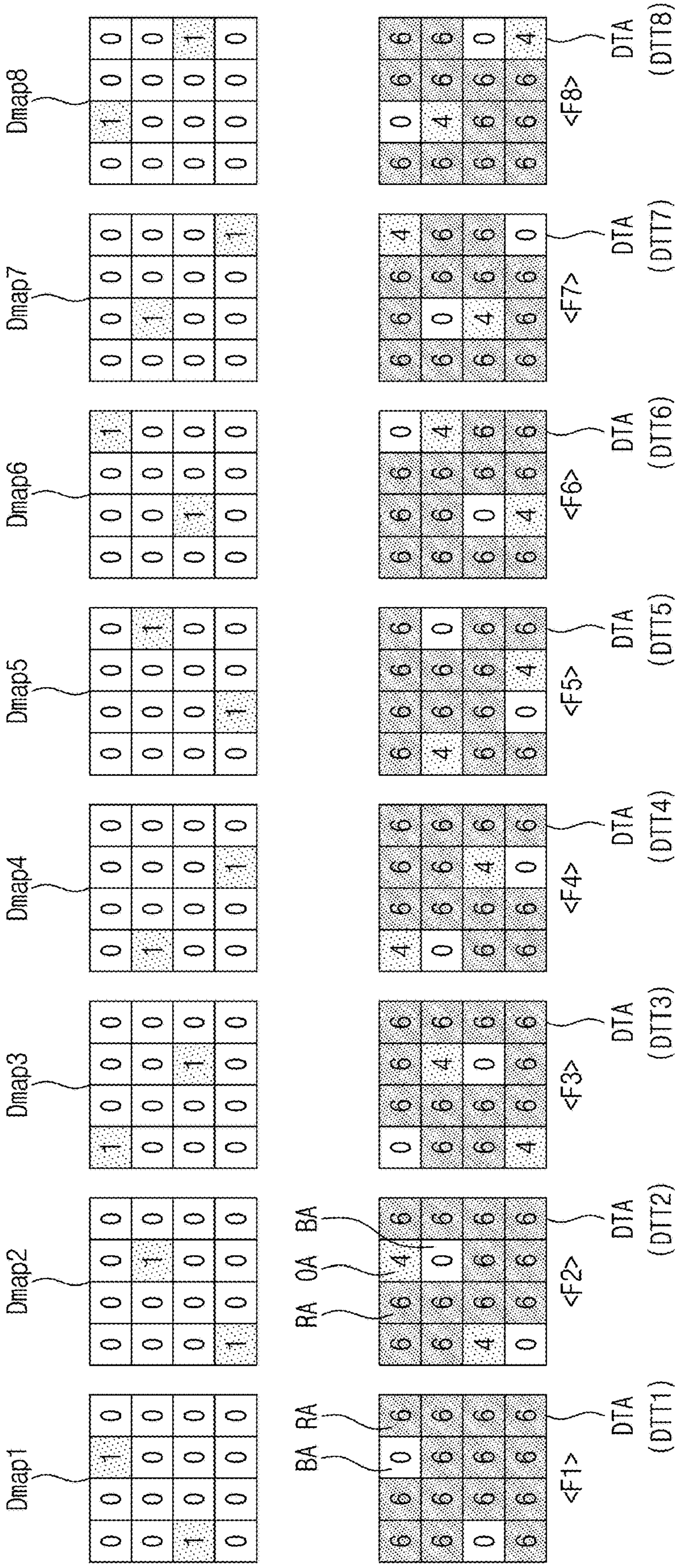
FIG. 8 is a diagram showing a grayscale displayed in a dithering area for each frame and a dithering map corresponding to a dithering area for each frame, according to an embodiment of the present disclosure.

FIG. 8 is a diagram showing a grayscale displayed in a dithering area for each frame and a dithering map corresponding to a dithering area for each frame, according to an embodiment of the present disclosure.

Referring to FIG. 8, the driving controller 100 (see FIG. 3) compares a target grayscale of the dithering area DTA with a predetermined reference grayscale to generate a comparison result. When the comparison result indicates that the target grayscale is lower than the reference grayscale, image data may be converted to display the target grayscale by using the reference grayscale and predetermined dithering maps.

During the predetermined number (e.g., 8) of frames F1, F2, F3, F4, F5, F6, F7, and F8, the driving controller 100 may operate such that different dither patterns DTT1, DTT2, DTT3, DTT4, DTT5, DTT6, DTT7, and DTT8 are displayed in the dithering area DTA, thereby allowing the target grayscale to be expressed in the dithering area DTA. During the corresponding frames F1, F2, F3, F4, F5, F6, F7, and F8, the dither pattern expressed in the dithering area DTA may be determined by dithering maps Dmap1, Dmap2, Dmap3, Dmap4, Dmap5, Dmap6, Dmap7, and Dmap8 respectively corresponding to the corresponding frames F1, F2, F3, F4, F5, F6, F7, and F8. For example, during the first frame F1 (or referred to as a "previous frame"), the dithering area DTA may express a first dither pattern DTT1, and the first dither pattern DTT1 may be determined by the first dithering map Dmap1. The dithering area DTA may include a plurality of grayscale areas (e.g., the 4×4 (i.e., 16) grayscale areas).

Some of the plurality of grayscale areas of the first dither pattern DTT1 may display the reference grayscale. Some of the plurality of grayscale areas may display a black grayscale. A grayscale area that displays the reference grayscale may be referred to as a "reference grayscale area RA". A grayscale area that displays the black grayscale may be referred to as a "black grayscale area BA". The first dither pattern DTT1 may include the two black grayscale areas BA and fourteen reference grayscale areas RA. As an example of the present disclosure, the reference grayscale may be grayscale 6, and the black grayscale may be grayscale 0. However, the level of the reference grayscale is not limited to grayscale 6, and may be changed to various grayscales (e.g., grayscale 4, grayscale 8, or grayscale 16). The reference grayscale may be set to a grayscale, in which no stain appears, from among low grayscales.

Each of the dithering maps may include dithering bits respectively corresponding to grayscale areas included in a dithering area. A dithering bit (i.e., a first dithering bit) for the reference grayscale area RA has an active state (or referred to as a "first state"). A dithering bit (i.e., a second dithering bit) for the black grayscale area BA has an inactive state (or referred to as a "second state"). As an example of the present disclosure, an active state may be represented by logic "0", and an inactive state may be represented by logic "1".

The first dithering map Dmap1 may include fourteen first dithering bits (0) and two second dithering bits (1). Reference grayscale 6 is expressed in grayscale areas respectively corresponding to the first dithering bits (0). Black grayscale 0 is expressed in the grayscale areas respectively corresponding to the second dithering bits (1).

In the second frame F2 (or referred to as a "current frame"), a dithering map applied to the dithering area DTA is changed to the second dithering map Dmap2. Accordingly, the second dither pattern DTT2 corresponding to the second dithering map Dmap2 may be displayed in the dithering area DTA. The second dither pattern DTT2 may include a plurality of grayscale areas (e.g., the 4×4 (i.e., 16) grayscale areas).

In an embodiment, some of the plurality of grayscale areas of the first dither pattern DTT2 display the reference grayscale, some of the plurality of grayscale areas of the first dither pattern DTT2 display the black grayscale, and some of the plurality of grayscale areas of the first dither pattern DTT2 display an offset grayscale. In an embodiment, the offset grayscale is lower than the reference grayscale and is higher than the black grayscale. A grayscale area that displays the offset grayscale may be referred to as an "offset grayscale area OA". The second dither pattern DTT2 may include two black grayscale areas BA, two offset grayscale areas OA, and twelve reference grayscale areas RA. As an example of the present disclosure, the reference grayscale may be grayscale 6, the black grayscale may be grayscale 0, and the offset grayscale may be grayscale 4. The level of the offset grayscale is not limited to grayscale 4. As an example of the present disclosure, the level of the offset grayscale may be determined based on the level of the reference grayscale. For example, when the reference grayscale is grayscale 4, the offset grayscale may be changed to grayscale 2.

The second dithering map Dmap2 may include fourteen first dithering bits (0) and two second dithering bits (1). The reference grayscale 6 or the offset grayscale 4 is expressed in grayscale areas respectively corresponding to the first dithering bits (0). The black grayscale 0 is expressed in grayscale areas respectively corresponding to the second dithering bits (1).

The offset grayscale area OA, which displays the offset grayscale 4 in the second frame F2, may be referred to as a "first grayscale area". The reference grayscale area RA, which displays the reference grayscale 4 in the second frame F2, may be referred to as a "second grayscale area". The offset grayscale area OA is a grayscale area that expresses the black grayscale 0 during a previous frame (i.e., the first frame F1). The reference grayscale area RA is a grayscale area that expresses the reference grayscale 6 during the previous frame (i.e., the first frame F1).

When the third frame F3 starts, the second frame F2 becomes the previous frame, and the third frame F3 becomes the current frame. In the third frame F3, a dithering map applied to the dithering area DTA is changed to the third dithering map Dmap3. Accordingly, the third dither pattern DTT3 corresponding to the third dithering map Dmap3 may be displayed in the dithering area DTA. The third dither pattern DTT3 may include two black grayscale areas BA, two offset grayscale areas OA, and twelve reference grayscale areas RA.

The third dithering map Dmap3 may include fourteen first dithering bits (0) and two second dithering bits (1). The reference grayscale 6 or the offset grayscale 4 is expressed in grayscale areas respectively corresponding to the first dithering bits (0). The black grayscale 0 is expressed in grayscale areas respectively corresponding to the second dithering bits (1).

The offset grayscale area OA, which displays an offset grayscale in the third frame F3, may be referred to as a "first grayscale area". The reference grayscale area RA, which displays the reference grayscale 6 in the second frame F2, may be referred to as a "second grayscale area". The offset grayscale area OA is a grayscale area that expresses the black grayscale 0 during a previous frame (i.e., the second frame F2). The reference grayscale area RA is a grayscale area that expresses the reference grayscale 6 during the previous frame (i.e., the second frame F2).

As such, when a grayscale area, which expresses the black grayscale 0 during the previous frame, immediately displays the reference grayscale during the current frame, overshoot may occur, and thus the offset grayscale 4 lower than the reference grayscale 6 may be applied to the corresponding grayscale area. Accordingly, a discoloration phenomenon where light of a specific color is perceived does not occur even though the overshoot occurs in the corresponding grayscale area during the current frame.

In an embodiment, when a region of the display panel includes a pixel that is planned to display a first grayscale lower than the reference grayscale during a first frame period and then display the reference grayscale during a second frame period immediately after the first frame period, the pixel is driven so that it displays the first grayscale during the first frame period, the offset grayscale during the second frame period, and the reference grayscale during a third frame period immediately after the second frame period.

Figure 9:
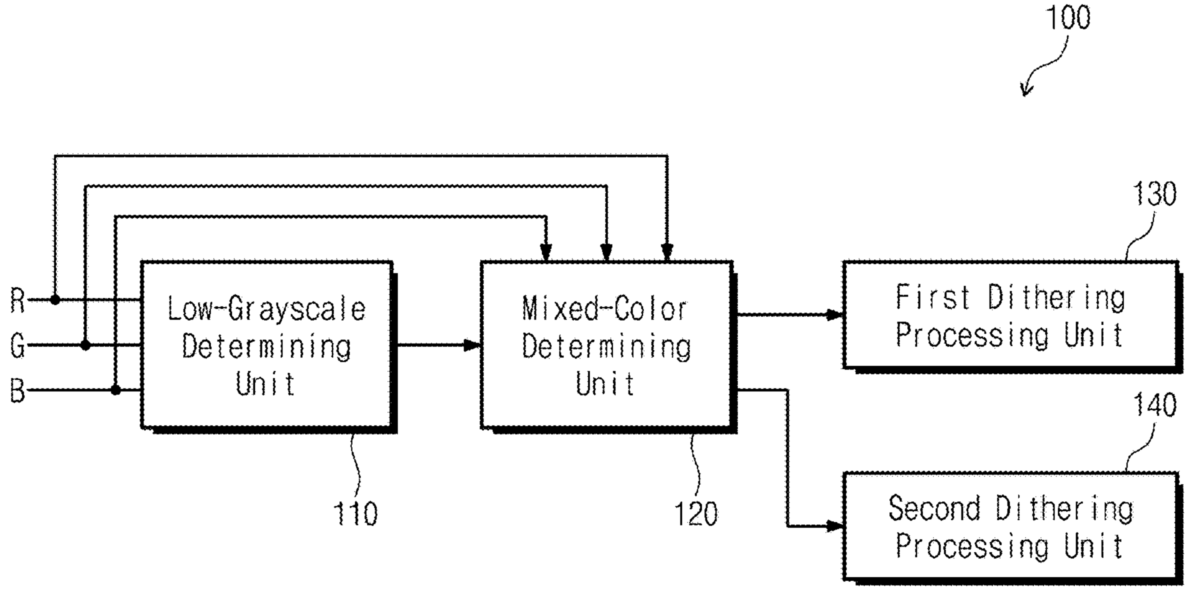
FIG. 9 is a block diagram of a driving controller according to an embodiment of the present disclosure.

FIG. 9 is a block diagram of a driving controller according to an embodiment of the present disclosure.

Referring to FIG. 9, the driving controller 100 includes a low-grayscale determining unit 110 (e.g., a first logic circuit or first processor), a mixed-color determining unit 120 (e.g., a second logic circuit or second processor), a first dithering processing unit 130 (e.g., a third logic circuit or third processor), and a second dithering processing unit 140 (e.g., a fourth logic circuit or fourth processor).

The low-grayscale determining unit 110 may receive the input image signal RGB and may calculate a target grayscale of each dithering area based on the input image signal RGB. The low-grayscale determining unit 110 compares the target grayscale of each dithering area with a predetermined reference grayscale and determines whether the target grayscale is lower than the reference grayscale. When the target grayscale is lower than the reference grayscale, the low-grayscale determining unit 110 determines that the dithering area is included in the low-grayscale display area LGA (see FIG. 6). When the target grayscale is higher than the reference grayscale, the low-grayscale determining unit 110 determines that the dithering area is not included in the low-grayscale display area LGA.

Depending on the determination result of the low-grayscale determining unit 110, it is determined whether the mixed-color determining unit 120 is activated. In other words, when it is determined that the dithering area is included in the low-grayscale display area LGA, the mixed-color determining unit 120 is activated. When it is determined that the dithering area is not included in the low-grayscale display area LGA, the mixed-color determining unit 120 is deactivated.

The mixed-color determining unit 120 determines whether a mixed-color condition is satisfied, by using the red, green, and blue input image signal RGB. In an embodiment, the mixed-color condition is a condition where at least two of the red, green, and blue input image signals RGB do not have the black grayscale 0, and two input image signals among the red, green, and blue input image signals RGB do not have the same grayscale as each other.

Depending on the determination result of the mixed-color determining unit 120, it is determined whether the first and second dithering processing units 130 and 140 are activated. In detail, when the mixed-color condition is not satisfied (hereinafter referred to as a "first case"), the first dithering processing unit 130 is activated. When the mixed-color condition is satisfied (hereinafter referred to as a "second case"), the second dithering processing unit 140 is activated.

Figure 10A:
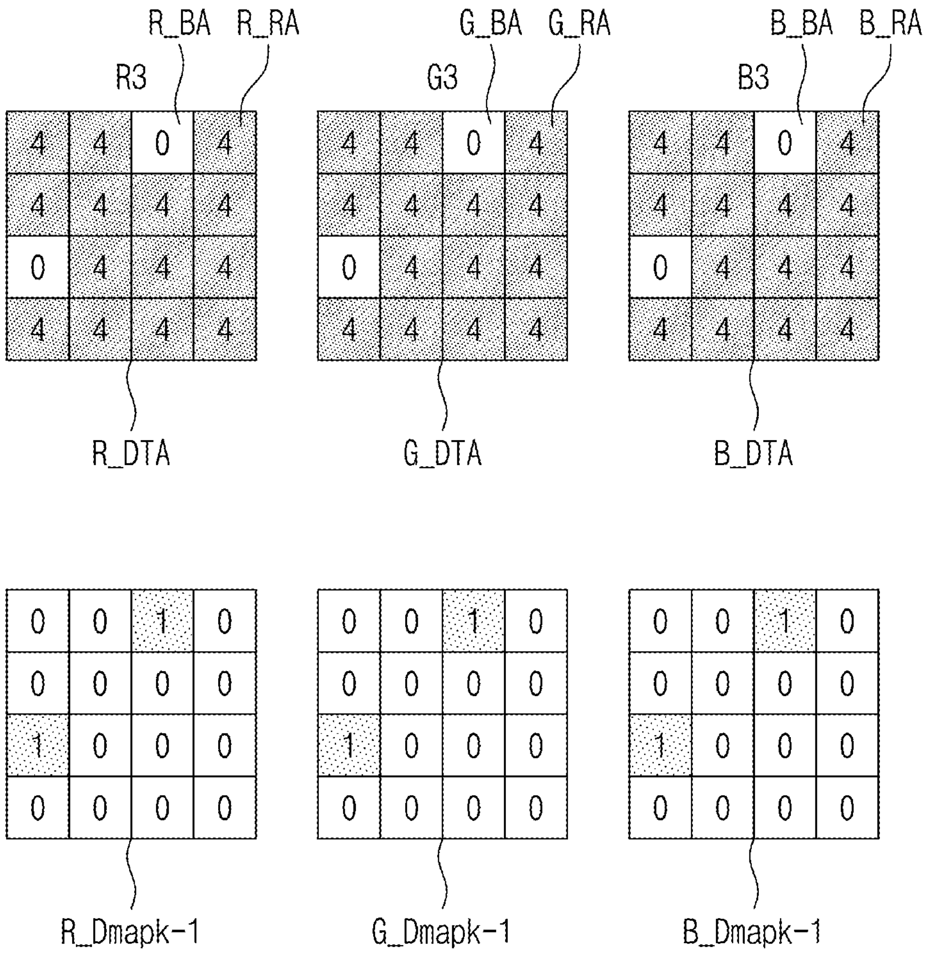
FIG. 10A is a diagram showing grayscales expressed in red, green, and blue dithering areas during a (k−1)-th frame in a first case, according to an embodiment of the present disclosure.
Figure 10B:
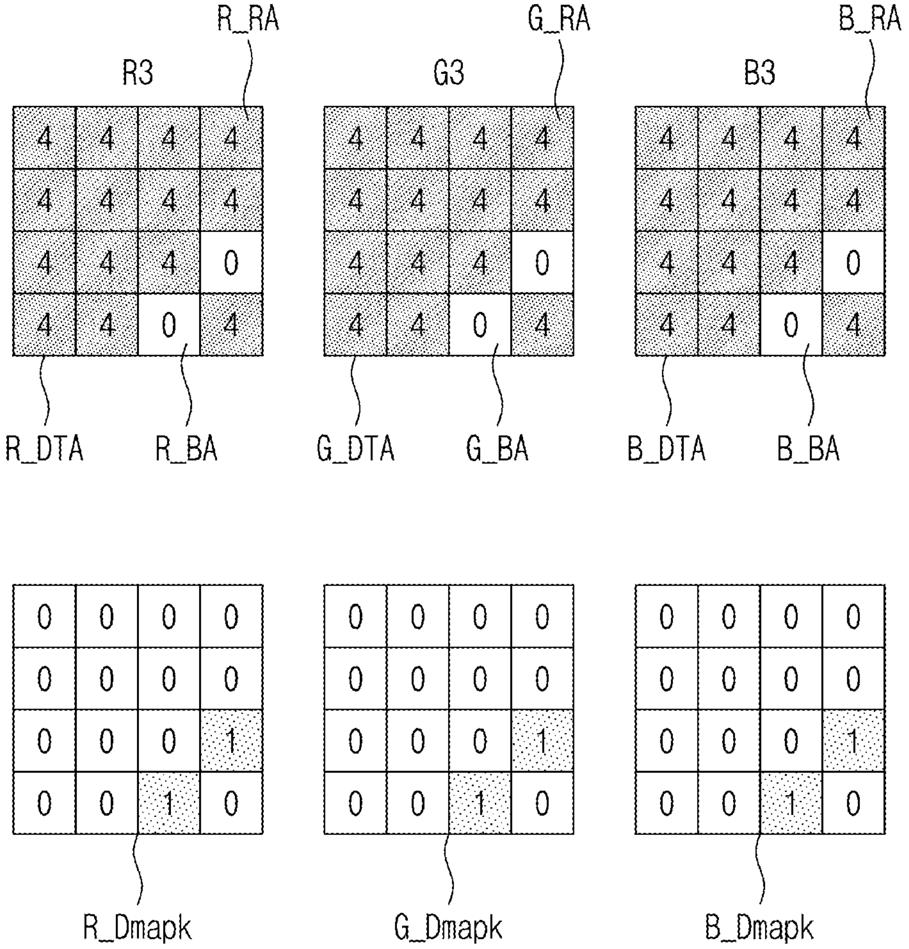
FIG. 10B is a diagram showing grayscales expressed in red, green, and blue dithering areas during a k-th frame in a first case, according to an embodiment of the present disclosure.

FIG. 10A is a diagram showing grayscales expressed in red, green, and blue dithering areas during a (k−1)-th frame in a first case, according to an embodiment of the present disclosure. FIG. 10B is a diagram showing grayscales expressed in red, green, and blue dithering areas during a k-th frame in a first case, according to an embodiment of the present disclosure.

Referring to FIGS. 9, 10A, and 10B, when a red target grayscale R3 of a red dithering area R_DTA for red color is equal to a green target grayscale G3 of a green dithering area G_DTA for green color and a blue target grayscale B3 of a blue dithering area B_DTA for blue color, the first dithering processing unit 130 is activated.

During a (k−1)-th frame Fk−1 (or referred to as a "previous frame"), the first dithering processing unit 130 expresses a (k−1)-th red dither pattern by applying a (k−1)-th red dithering map R_Dmapk−1 to the red dithering area R_DTA. During the (k−1)-th frame Fk−1, the first dithering processing unit 130 expresses a (k−1)-th green dither pattern by applying a (k−1)-th green dithering map G_Dmapk−1 to the green dithering area G_DTA. During the (k−1)-th frame Fk−1, the first dithering processing unit 130 expresses a (k−1)-th blue dither pattern by applying a (k−1)-th blue dithering map B_Dmapk−1 to the blue dithering area B_DTA. During the (k−1)-th frame Fk−1, the red dithering area R_DTA includes a red reference grayscale area R_RA with the reference grayscale 4 and a red black grayscale area R_BA with the black grayscale 0. During the (k−1)-th frame Fk−1, the green dithering area G_DTA includes a green reference grayscale area G_RA with the reference grayscale 4 and a green black grayscale area G_BA with the black grayscale 0. During the (k−1)-th frame Fk−1, the blue dithering area B_DTA includes a blue reference grayscale area B_RA with the reference grayscale 4 and a blue black grayscale area B_BA with the black grayscale 0.

During a k-th frame Fk (or referred to as a "current frame"), the first dithering processing unit 130 expresses a k-th red dither pattern by applying a k-th red dithering map) R_Dmapk to the red dithering area R_DTA. During the k-th frame Fk, the first dithering processing unit 130 expresses a k-th green dither pattern by applying a k-th green dithering map G_Dmapk to the green dithering area G_DTA. During the k-th frame Fk, the first dithering processing unit 130 expresses a k-th blue dither pattern by applying a k-th blue dithering map B_Dmapk to the blue dithering area B_DTA.

During the k-th frame Fk, the red dithering area R_DTA includes the red reference grayscale area R_RA with the reference grayscale 4 and the red black grayscale area R_BA with the black grayscale 0. In other words, during the k-th frame Fk, the first dithering processing unit 130 may apply the reference grayscale 4 to the red black grayscale area R_BA, which expresses the black grayscale 0 during the (k−1)-th frame Fk−1. During the k-th frame Fk, the green dithering area G_DTA includes the green reference grayscale area G_RA with the reference grayscale 4 and the green black grayscale area G_BA with the black grayscale 0. In other words, during the k-th frame Fk, the first dithering processing unit 130 may apply the reference grayscale 4 to the green black grayscale area G_BA, which expresses the black grayscale 0 during the (k−1)-th frame Fk−1. During the (k−1)-th frame Fk−1, the blue dithering area B_DTA includes the blue reference grayscale area B_RA with the reference grayscale 4 and the blue black grayscale area B_BA with the black grayscale 0. In other words, during the k-th frame Fk, the first dithering processing unit 130 may apply the reference grayscale 4 to the blue black grayscale area B_BA, which expresses the black grayscale 0 during the (k−1)-th frame Fk−1.

In the first case, the first dithering processing unit 130 is activated to manage the color consistency and grayscale transitions between frames for a display device. Specifically, during the previous frame, specific dithering maps for red, green, and blue are applied to their respective dithering areas, and a predefined dither pattern for each color that includes areas with a reference grayscale of 4 and a black grayscale of 0 are set. Then, in the subsequent frame, the unit continues this pattern but updates the areas that were black in the previous frame to the reference grayscale of 4. This transition strategy helps in achieving a smooth progression of color and grayscale values across frames, enhancing the overall visual quality of the display by reducing potential artifacts like color banding or abrupt changes in grayscale intensity.

Figure 11A:
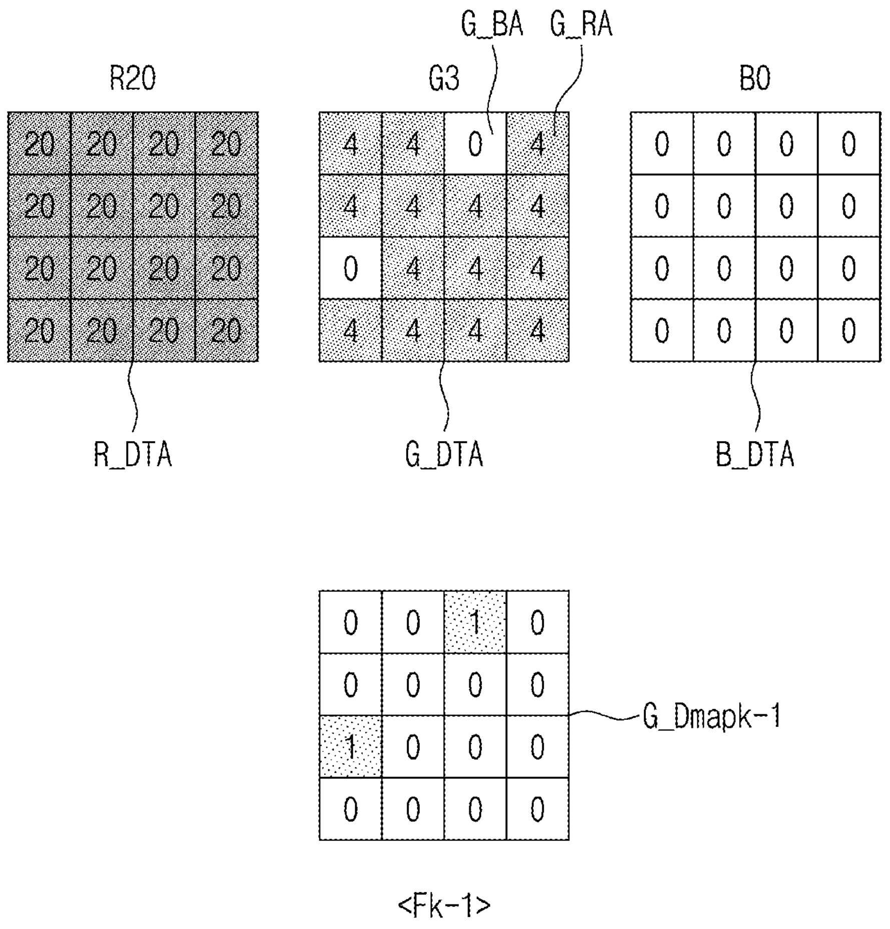
FIG. 11A is a diagram showing grayscales expressed in red, green, and blue dithering areas during a (k−1)-th frame in a second case, according to an embodiment of the present disclosure.
Figure 11B:
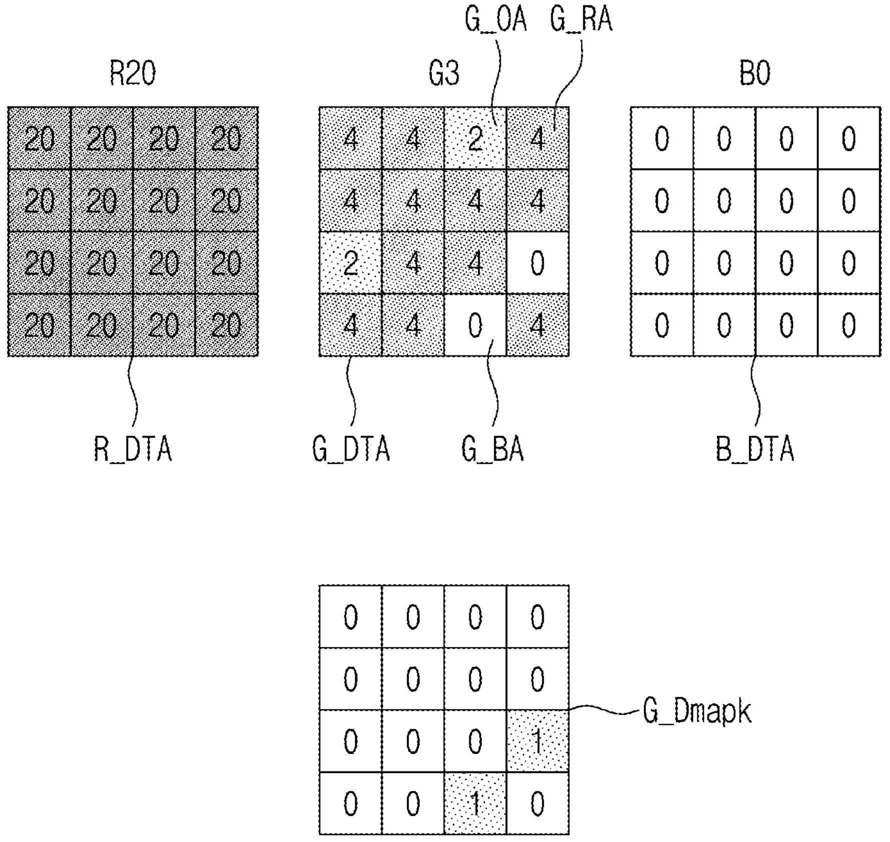
FIG. 11B is a diagram showing grayscales expressed in red, green, and blue dithering areas during a k-th frame in a second case, according to an embodiment of the present disclosure.
Figure 11C:
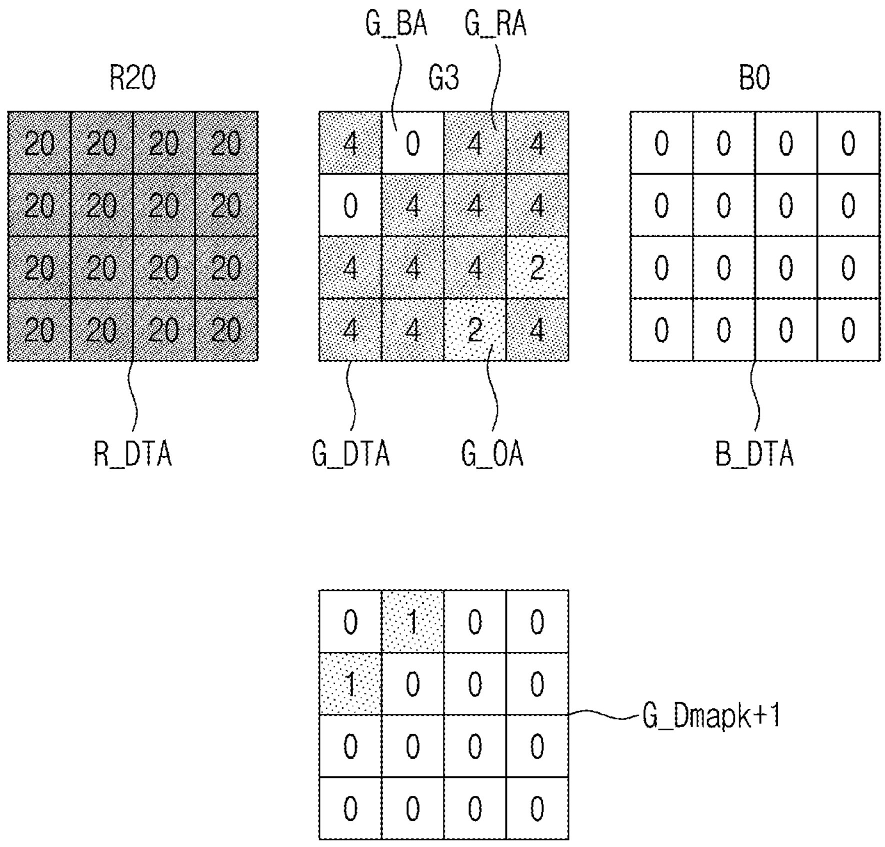
FIG. 11C is a diagram showing grayscales expressed in red, green, and blue dithering areas during a (k+1)-th frame in a second case, according to an embodiment of the present disclosure.

FIG. 11A is a diagram showing grayscales expressed in red, green, and blue dithering areas during a (k−1)-th frame in a second case, according to an embodiment of the present disclosure. FIG. 11B is a diagram showing grayscales expressed in red, green, and blue dithering areas during a k-th frame in a second case, according to an embodiment of the present disclosure. FIG. 11C is a diagram showing grayscales expressed in red, green, and blue dithering areas during a (k+1)-th frame in a second case, according to an embodiment of the present disclosure.

FIGS. 11A to 11C illustrate a case, in which a red target grayscale of the red dithering area R_DTA for red color is higher than a reference grayscale, and a green target grayscale of the green dithering area G_DTA for green color is lower than the reference grayscale, from among the second case that satisfies a mixed-color condition. The second dithering processing unit 140 is activated in the second case.

Referring to FIGS. 11A to 11C, the red target grayscale of the red dithering area R_DTA may be grayscale 20, and the green target grayscale of the green dithering area G_DTA may be grayscale 3. Here, the reference grayscale may be grayscale 4. Because the red target grayscale R20 of the red dithering area R_DTA is higher than the reference grayscale 4, the red dithering area R_DTA is not included in the low-grayscale display area LGA (see FIG. 6), and thus a dithering operation is not applied to the red dithering area R_DTA. In the meantime, because the green target grayscale G3 of the green dithering area G_DTA is lower than the reference grayscale 4, the green dithering area G_DTA is included in the low-grayscale display area LGA, and thus the dithering operation is applied to the green dithering area G_DTA.

During the (k−1)-th frame Fk−1 (or referred to as a "previous frame"), the second dithering processing unit 140 expresses a (k−1)-th green dither pattern by applying the (k−1)-th green dithering map G_Dmapk−1 to the green dithering area G_DTA. During the (k−1)-th frame Fk−1, the green dithering area G_DTA includes the fourteen green reference grayscale areas G_RA with the reference grayscale 4 and the two green black grayscale areas G_BA with the black grayscale 0.

During the k-th frame Fk (or referred to as a "current frame"), the second dithering processing unit 140 expresses a k-th green dither pattern by applying the k-th green dithering map G_Dmapk to the green dithering area G_DTA. During the k-th frame Fk, the green dithering area G_DTA includes the twelve green reference grayscale areas G_RA with reference grayscale 4, the two green black grayscale areas G_BA with the black grayscale 0, and two green offset grayscale areas G_OA with the offset grayscale 2. In other words, during the k-th frame Fk, the second dithering processing unit 140 may apply the offset grayscale 2 to the green black grayscale area G_BA, which expresses the black grayscale 0 during the (k−1)-th frame Fk−1.

During a (k+1)-th frame Fk+1 (or referred to as a "next frame"), the second dithering processing unit 140 expresses a (k+1)-th green dither pattern by applying a (k+1)-th green dithering map G_Dmapk+1 to the green dithering area G_DTA. During the (k+1)-th frame Fk+1, the green dithering area G_DTA includes the twelve green reference grayscale areas G_RA with the reference grayscale 4, the two green black grayscale areas G_BA with the black grayscale 0, and the two green offset grayscale areas G_OA with the offset grayscale 2. In other words, during the (k+1)-th frame Fk+1, the second dithering processing unit 140 may apply the offset grayscale 2 to the green black grayscale area G_BA, which expresses the black grayscale 0 during the k-th frame Fk.

In the second case, the second dithering processing unit 140 handles a mixed-color condition where different grayscale values are targeted for different colors across sequential frames. Specifically, during the (k−1)-th, the k-th, and the (k+1)-th frames, the unit manages the green dithering area G_DTA, where the green target grayscale is below the reference grayscale of 4. This results in the application of dithering operations to manage the transition of grayscale values smoothly. For instance, in the (k−1)-th frame, the green dithering area includes mostly green reference grayscale areas and a couple of black grayscale areas. As frames progress to k-th and (k+1)-th, these black areas transition through an intermediate offset grayscale of 2, which helps mitigate any harsh transitions or visual artifacts, providing a smoother gradient and consistent visual quality as the display transitions through different grayscale intensities in these areas. This strategic grayscale management helps prevent issues like banding or abrupt changes, particularly in areas of lower grayscale intensity.

The difference between the first case and second case" involves the application of dithering techniques under uniform versus variable grayscale conditions across color zones in a display. In the first case, all color areas—red, green, and blue—are treated uniformly, updating black grayscale areas directly to a reference grayscale in a straightforward manner, which simplifies transitions but is less adaptive. In contrast, the second case handles mixed-color conditions with significant variations in target grayscales for different colors; it employs a more complex dithering strategy that involves intermediate offset grayscales to prevent visual artifacts. This approach allows for nuanced transitions, especially in zones with lower grayscale values, thereby enhancing overall visual quality by addressing the specific needs of each color zone more effectively.

Figure 12A:
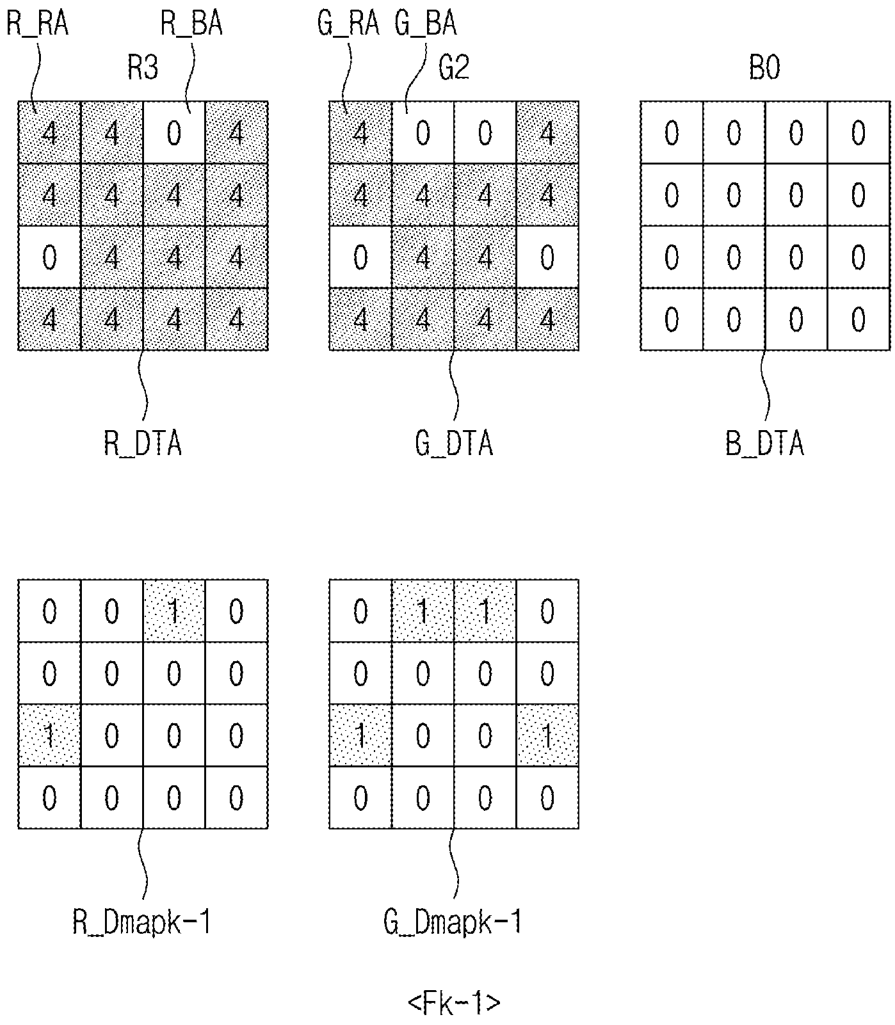
FIG. 12A is a diagram showing grayscales expressed in red, green, and blue dithering areas during a (k−1)-th frame in a second case, according to an embodiment of the present disclosure.
Figure 12B:
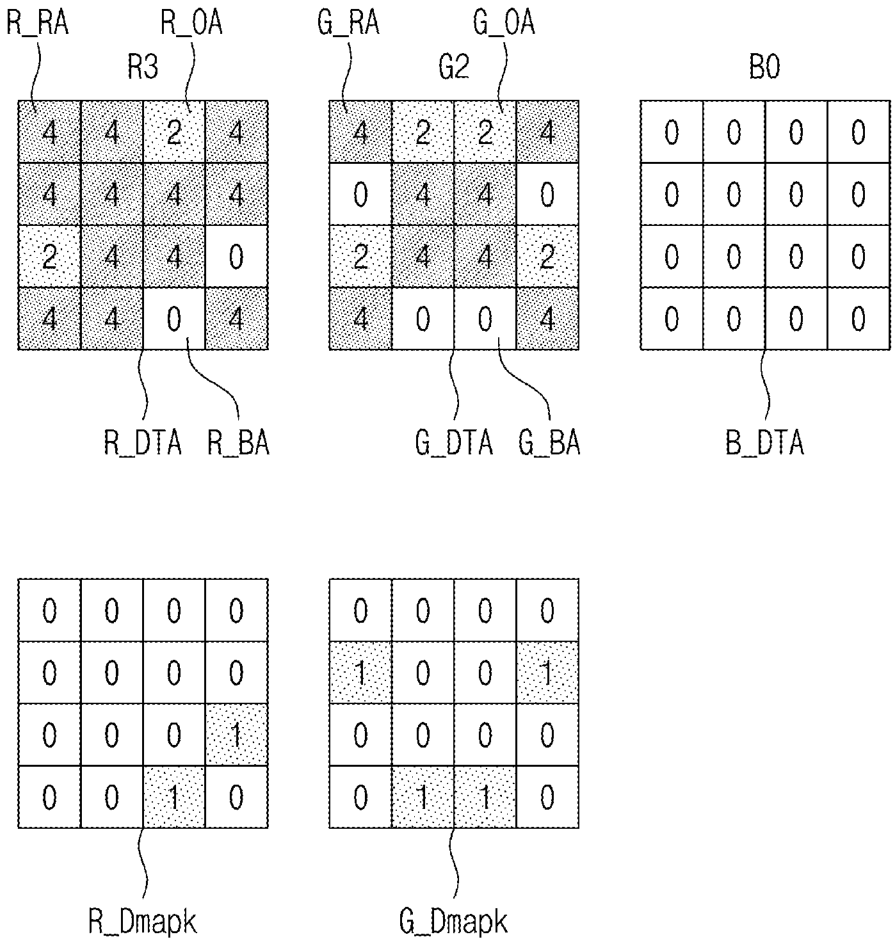
FIG. 12B is a diagram showing grayscales expressed in red, green, and blue dithering areas during a k-th frame in a second case, according to an embodiment of the present disclosure.
Figure 12C:
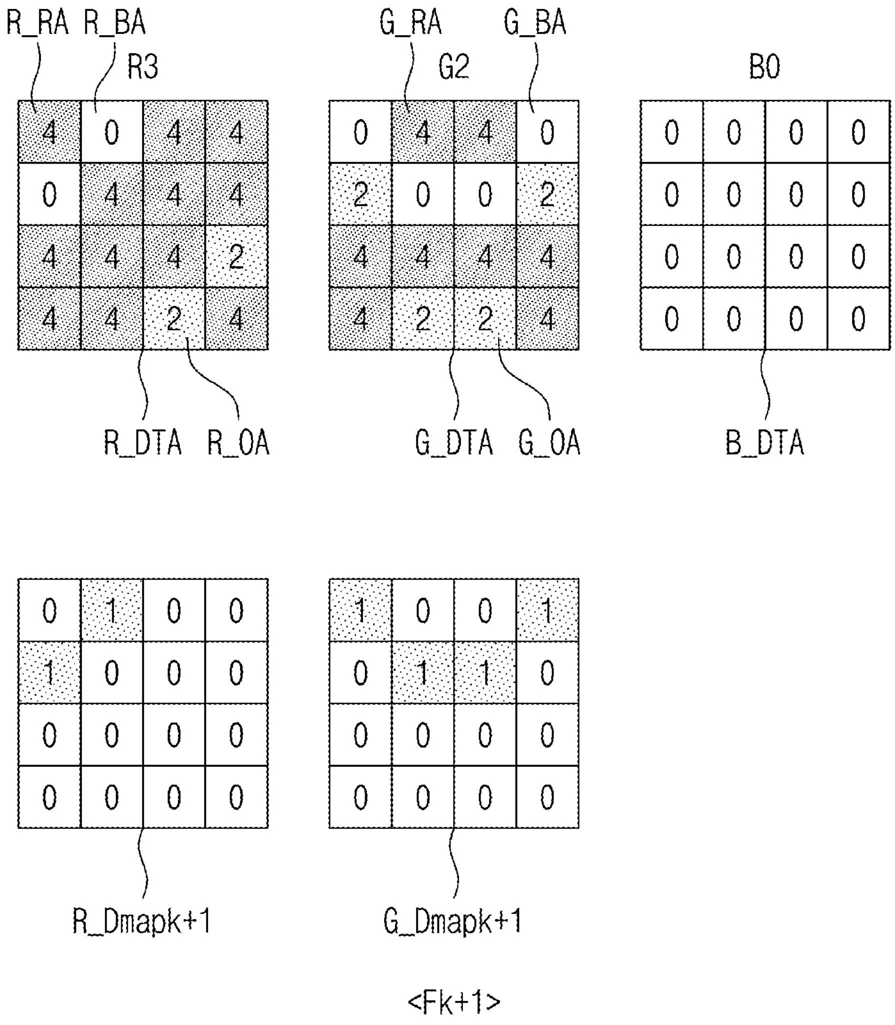
FIG. 12C is a diagram showing grayscales expressed in red, green, and blue dithering areas during a (k+1)-th frame in a second case, according to an embodiment of the present disclosure.

FIG. 12A is a diagram showing grayscales expressed in red, green, and blue dithering areas during a (k−1)-th frame in a second case, according to an embodiment of the present disclosure. FIG. 12B is a diagram showing grayscales expressed in red, green, and blue dithering areas during a k-th frame in a second case, according to an embodiment of the present disclosure. FIG. 12C is a diagram showing grayscales expressed in red, green, and blue dithering areas during a (k+1)-th frame in a second case, according to an embodiment of the present disclosure.

FIGS. 12A to 12C illustrate a case, in which a red target grayscale of a red dithering area for red color is lower than the reference grayscale, and a green target grayscale of a green dithering area for green color is lower than the reference grayscale, from among the second case that satisfies a mixed-color condition.

Referring to FIGS. 12A to 12C, the red target grayscale of the red dithering area R_DTA may be grayscale 3, and the green target grayscale of the green dithering area G_DTA may be grayscale 2. Here, the reference grayscale may be grayscale 4. Because the red target grayscale R3 of the red dithering area R_DTA is lower than the reference grayscale 4, the red dithering area R_DTA is included in the low-grayscale display area LGA (see FIG. 6), and thus a dithering operation is applied to the red dithering area R_DTA. Moreover, because the green target grayscale G2 of the green dithering area G_DTA is lower than the reference grayscale 4, the green dithering area G_DTA is included in the low-grayscale display area LGA, and thus the dithering operation is applied to the green dithering area G_DTA.

During the (k−1)-th frame Fk−1 (or referred to as a "previous frame"), the second dithering processing unit 140 expresses a (k−1)-th red dither pattern by applying the (k−1)-th red dithering map R_Dmapk−1 to the red dithering area R_DTA, and expresses a (k−1)-th green dither pattern by applying the (k−1)-th green dithering map G_Dmapk−1 to the green dithering area G_DTA. During the (k−1)-th frame Fk−1, the red dithering area R_DTA includes the fourteen red reference grayscale areas R_RA with the reference grayscale 4 and the two red black grayscale areas R_BA with the black grayscale 0. During the (k−1)-th frame Fk−1, the green dithering area G_DTA includes the twelve green reference grayscale areas G_RA with the reference grayscale 4 and the four green black grayscale areas G_BA with the black grayscale 0.

During the k-th frame Fk (or referred to as a "current frame"), the second dithering processing unit 140 expresses a k-th red dither pattern by applying the k-th red dithering map R_Dmapk to the red dithering area R_DTA, and expresses a k-th green dither pattern by applying the k-th green dithering map G_Dmapk to the green dithering area G_DTA.

During the k-th frame Fk, the red dithering area R_DTA includes the twelve red reference grayscale areas R_RA with the reference grayscale 4, the two red black grayscale areas R_BA with the black grayscale 0, and the two red offset grayscale areas R_OA with the offset grayscale 2 (or a red offset grayscale). In other words, during the k-th frame Fk, the second dithering processing unit 140 may apply the offset grayscale 2 to the two red black grayscale areas R_BA, which expresses the black grayscale 0 during the (k−1)-th frame Fk−1.

During the k-th frame Fk, the green dithering area G_DTA includes the eight green reference grayscale areas G_RA with the reference grayscale 4, the four green black grayscale areas G_BA with the black grayscale 0, and the four green offset grayscale areas G_OA with the offset grayscale 2 (or a green offset grayscale). In other words, during the k-th frame Fk, the second dithering processing unit 140 may apply the offset grayscale 2 to the four green black grayscale areas G_BA, which expresses the black grayscale 0 during the (k−1)-th frame Fk−1.

During the (k+1)-th frame Fk+1 (or referred to as a "next frame"), the second dithering processing unit 140 expresses a (k+1)-th red dither pattern by applying the (k+1)-th red dithering map R_Dmapk+1 to the red dithering area R_DTA, and expresses a (k+1)-th green dither pattern by applying the (k+1)-th green dithering map G_Dmapk+1 to the green dithering area G_DTA.

During the k-th frame Fk, the red dithering area R_DTA includes the twelve red reference grayscale areas R_RA with the reference grayscale 4, the two red black grayscale areas R_BA with the black grayscale 0, and the two red offset grayscale areas R_OA with the offset grayscale 2. In other words, during the (k+1)-th frame Fk+1, the second dithering processing unit 140 may apply the offset grayscale 2 to the two red black grayscale area R_BA, which expresses the black grayscale 0 during the k-th frame Fk.

During the (k+1)-th frame Fk+1, the green dithering area G_DTA includes the eight green reference grayscale areas G_RA with the reference grayscale 4, the four green black grayscale areas G_BA with the black grayscale 0, and the four green offset grayscale areas G_OA with the offset grayscale 2. In other words, during the (k+1)-th frame Fk+1, the second dithering processing unit 140 may apply the offset grayscale 2 to the four green black grayscale areas G_BA, which expresses the black grayscale 0 during the k-th frame Fk.

FIGS. 12B and 12C illustrate a case where a red offset grayscale and a green offset grayscale are equal to each other at 2, but the present disclosure is not limited thereto. Alternatively, the red offset grayscale may be different from the green offset grayscale. For example, the red offset grayscale may be 3, and the green offset grayscale may be 2.

The above describes a detailed dithering process involving the second dithering processing unit 140 across multiple frames, where both the red and green dithering areas have target grayscales below the reference grayscale of 4. This leads to both areas being treated in the low-grayscale display area LGA, prompting dithering operations to manage transitions smoothly. Specifically, during the (k−1)-th frame, initial dither patterns are applied with most areas showing the reference grayscale and a few showing black. By the k-th frame, areas that were black in the previous frame transition to an intermediate offset grayscale of 2, which helps to mitigate abrupt visual changes. This process is continued into the (k+1)-th frame, ensuring that these transitions remain smooth and consistent. This approach allows for gradual changes in intensity, enhancing the display's quality by avoiding sudden jumps in grayscale that can lead to visual artifacts.

Figure 13A:
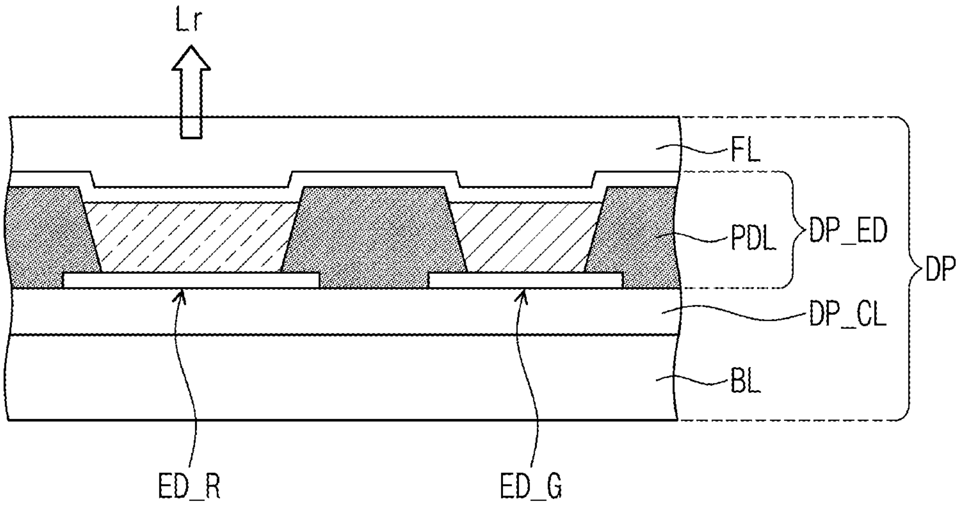
FIG. 13A is a cross-sectional view showing emission states of red and green light emitting elements during a (k−1)-th frame in a second case, according to an embodiment of the present disclosure.
Figure 13B:
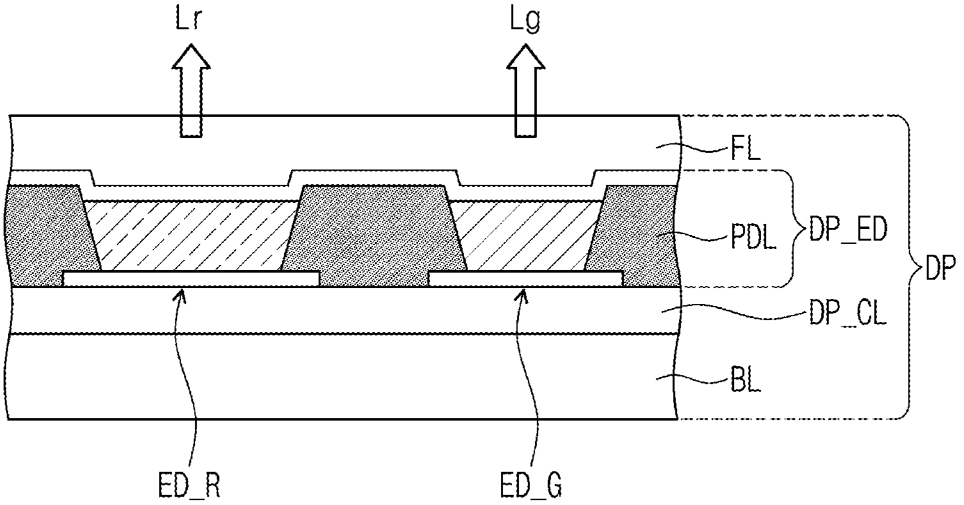
FIG. 13B is a cross-sectional view showing emission states of red and green light emitting elements during a k-th frame in a second case, according to an embodiment of the present disclosure.

FIG. 13A is a cross-sectional view showing emission states of red and green light emitting elements during a (k−1)-th frame in a second case, according to an embodiment of the present disclosure. FIG. 13B is a cross-sectional view showing emission states of red and green light emitting elements during a k-th frame in a second case, according to an embodiment of the present disclosure.

Referring to FIGS. 11A and 13A, the red light emitting element ED_R present in the red dithering area R_DTA during a (k−1)-th frame Fk−1 may output red light Lr having grayscale 20. During a (k−1)-th frame Fk−1, the black grayscale area G_BA of the green dithering area G_DTA expresses grayscale 0, and thus the green light emitting element ED_G in the black grayscale area G_BA is turned off. Accordingly, the green light emitting element ED_G present in the black grayscale area G_BA does not emit green light during the (k−1)-th frame Fk−1. When the red light emitting element ED_R emits light, charges may be accumulated in the pixel defining layer PDL arranged around the red light emitting element ED_R.

Referring to FIGS. 11B and 13B, the red light emitting element ED_R present in the red dithering area R_DTA during a k-th frame Fk may continuously output red light Lr having grayscale 20. In the meantime, the green light emitting element ED_G of the black grayscale area G_BA that expressed a black grayscale during the (k−1)-th frame Fk−1 is turned on during the k-th frame Fk. The charges accumulated in the pixel defining layer PDL around the red light emitting element ED_R may move to the green light emitting element ED_G, thereby causing overshoot in the green light Lg output from the green light emitting element ED_G. According to an embodiment of the present disclosure, during the k-th frame Fk, a data signal corresponding to an offset grayscale (i.e., 2) lower than the reference grayscale 4 is applied to the green light emitting element ED_G. Accordingly, even when the luminance of the green light Lg increases due to the overshoot, a discoloration phenomenon that green color light is perceived may be prevented.

FIGS. 11A and 13A correspond to the (k−1)th frame. In these figures, the red light emitting element ED_R in the red dithering area R_DTA is active and emitting light at a high grayscale of 20, while the green light emitting element ED_G in the black grayscale area G_BA of the green dithering area G_DTA is turned off (grayscale 0), leading to no emission of green light. This setup results in the accumulation of charges around the active red light emitting element due to its continuous operation.

FIGS. 11B and 13B correspond to k-th frame, where both the red and green light emitting elements are active. The red element continues to emit at the same intensity as in the (k−1)-th frame, while the green element, previously turned off, is now activated and set to emit light at an offset grayscale of 2, which is intentionally lower than the standard reference grayscale of 4.

Figure 14:
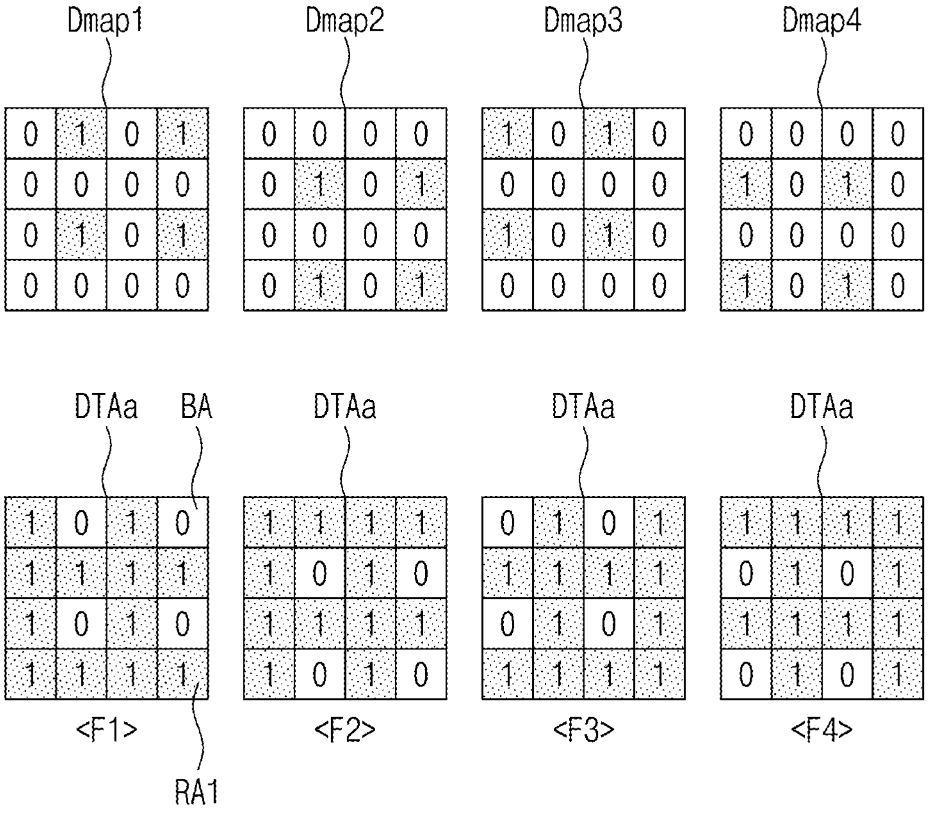
FIG. 14 is a diagram showing a grayscale displayed in a first dithering area for each frame and a first dithering map corresponding to the first dithering area, according to an embodiment of the present disclosure.
Figure 15:
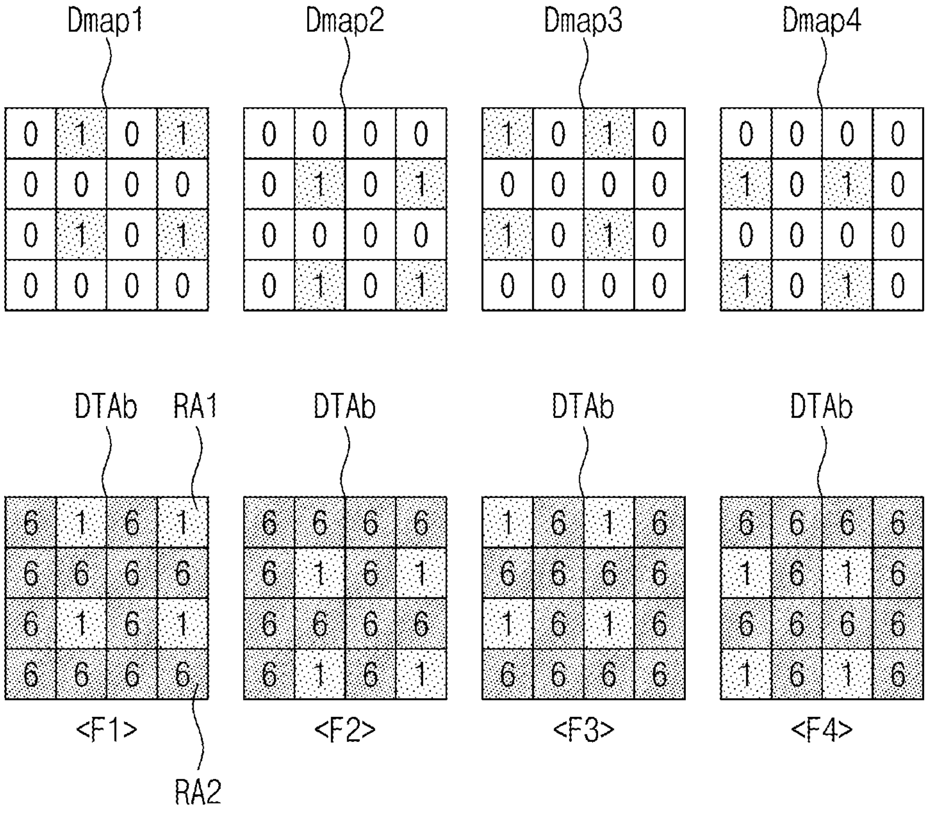
FIG. 15 is a diagram showing a grayscale displayed in a second dithering area for each frame and a second dithering map corresponding to the second dithering area, according to an embodiment of the present disclosure.

FIG. 14 is a diagram showing a grayscale displayed in a first dithering area for each frame and a first dithering map corresponding to the first dithering area, according to an embodiment of the present disclosure. FIG. 15 is a diagram showing a grayscale displayed in a second dithering area for each frame and a second dithering map corresponding to the second dithering area, according to an embodiment of the present disclosure.

Referring to FIGS. 9, 14, and 15, the second dithering processing unit 140 may compare a target grayscale of a dithering area with predetermined first and second reference grayscales to generate a comparison result and may express a grayscale by applying one of first and second dithering methods to the dithering area according to the comparison result.

As shown in FIG. 14, when the target grayscale of a first dithering area DTAa is lower than the first reference grayscale, the second dithering processing unit 140 expresses the target grayscale by applying the first dithering method using the first reference grayscale and the predetermined first dithering maps.

The first dithering area DTAa includes a plurality of grayscale areas. Some of the plurality of grayscale areas may display the first reference grayscale. Some of the plurality of grayscale areas may display a black grayscale. A grayscale area that displays the first reference grayscale may be referred to as a "first reference grayscale area RA1". A grayscale area that displays the black grayscale may be referred to as a "black grayscale area BA".

When the target grayscale of the first dithering area DTAa is present between the black grayscale and the first reference grayscale, the second dithering processing unit 140 may express the target grayscale by applying the black grayscale or the first reference grayscale to the plurality of grayscale areas. As an example of the present disclosure, the first reference grayscale may be grayscale 1, and the black grayscale may be grayscale 0. However, the level of the first reference grayscale is not limited to grayscale 1, and may be changed to various grayscales (e.g., grayscale 2 or grayscale 3).

Each of dithering maps Dmap1 to Dmap4 may include dithering bits respectively corresponding to grayscale areas included in the dithering area. A dithering bit (i.e., a first dithering bit) for the first reference grayscale area RA has an active state (or referred to as a "first state"). A dithering bit (i.e., a second dithering bit) for the black grayscale area BA has an inactive state (or referred to as a "second state"). As an example of the present disclosure, the active state may be represented by logic "0", and the inactive state may be represented by logic "1".

As an example of the present disclosure, each of the dithering maps Dmap1 to Dmap4 may include twelve first dithering bits (0) and four second dithering bits (1). The first reference grayscale 1 may be expressed in grayscale areas respectively corresponding to the first dithering bits (0). The black grayscale 0 may be expressed in grayscale areas respectively corresponding to the second dithering bits (1).

The second dithering processing unit 140 may manage grayscale expression in a first dithering area DTAa based on predefined dithering strategies illustrated in FIG. 14. When the target grayscale in DTAa falls below the first reference grayscale, the unit employs the first dithering method, using dithering maps to toggle between the black grayscale and the first reference grayscale. The area is divided into various grayscale zones, some displaying the black grayscale (BA) and others the first reference grayscale (RA1). Depending on the specific grayscale target, the unit adjusts the display either to black (0) or to a potentially adjustable first reference grayscale (commonly 1, but can vary up to 3). The dithering maps consist of bits configured in active (0) or inactive (1) states to represent these grayscale values appropriately, allowing for flexible and dynamic visual representation within the dithering area.

As shown in FIG. 15, when the target grayscale of a second dithering area DTAb is higher than or equal to the first reference grayscale and lower than or equal to the second reference grayscale, the second dithering processing unit 140 expresses the target grayscale by applying the second dithering method using the first reference grayscale, the second reference grayscale, and predetermined second dithering maps.

The second dithering area DTAb includes a plurality of grayscale areas. Some of the plurality of grayscale areas may display the second reference grayscale. Some of the plurality of grayscale areas may display the first reference grayscale. A grayscale area that displays the second reference grayscale may be referred to as a "second reference grayscale area RA2". A grayscale area that displays the first reference grayscale may be referred to as a "first reference grayscale area RA1".

When the target grayscale of the second dithering area DTAb is present between the first reference grayscale and the second reference grayscale, the second dithering processing unit 140 may express the target grayscale by applying the first reference grayscale or the second reference grayscale to the plurality of grayscale areas. As an example of the present disclosure, the second reference grayscale may be grayscale 6, and the first reference grayscale may be grayscale 1. However, the level of the second reference grayscale is not limited to grayscale 6, and may be changed to various grayscales (e.g., grayscale 4, grayscale 8, or grayscale 16).

Each of dithering maps Dmap1 to Dmap4 may include dithering bits respectively corresponding to grayscale areas included in the dithering area. A dithering bit (i.e., a first dithering bit) for the second reference grayscale area RA2 has an active state (or referred to as a "first state"). A dithering bit (i.e., a second dithering bit) for the first reference grayscale area RA1 has an inactive state (or referred to as a "second state"). As an example of the present disclosure, the active state may be represented by logic "0", and the inactive state may be represented by logic "1".

Each of the dithering maps Dmap1 to Dmap4 may include twelve first dithering bits (0) and four second dithering bits (1). The second reference grayscale 6 is expressed in grayscale areas respectively corresponding to the first dithering bits (0). The first reference grayscale 1 is expressed in grayscale areas respectively corresponding to the second dithering bits (1).

In FIG. 15, the second dithering processing unit 140 may manage the grayscale display within a second dithering area DTAb that falls between the first and second reference grayscales. This management involves applying the second dithering method, which uses a combination of these two reference grayscales along with designated dithering maps. The second dithering area consists of various zones, some showing the first reference grayscale and others showing the higher second reference grayscale. This setup enables flexible representation, allowing the unit to adjust the display dynamically based on the target grayscale within the specified range. For example, the first reference grayscale might be set at a low value such as 1, while the second can be much higher, such as 6, and adjustable to other values like 4, 8, or 16, depending on the desired visual output.

Figure 16A:
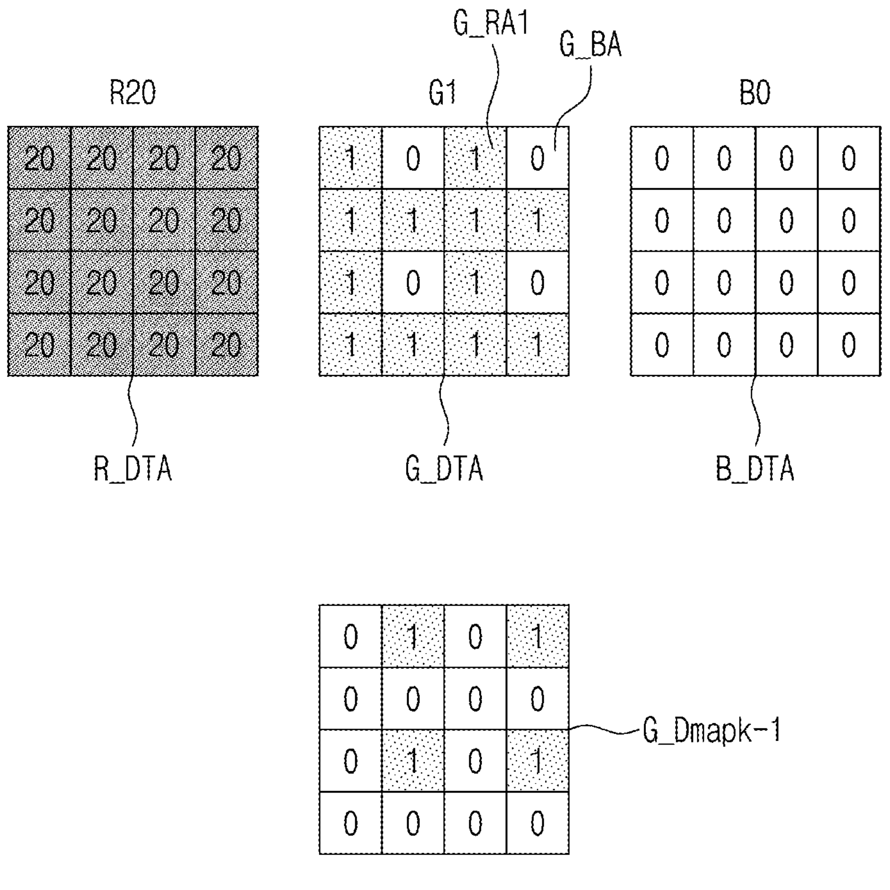
FIG. 16A is a diagram showing grayscales expressed in first red, first green, and first blue dithering areas during a (k−1)-th frame, according to an embodiment of the present disclosure.
Figure 16B:
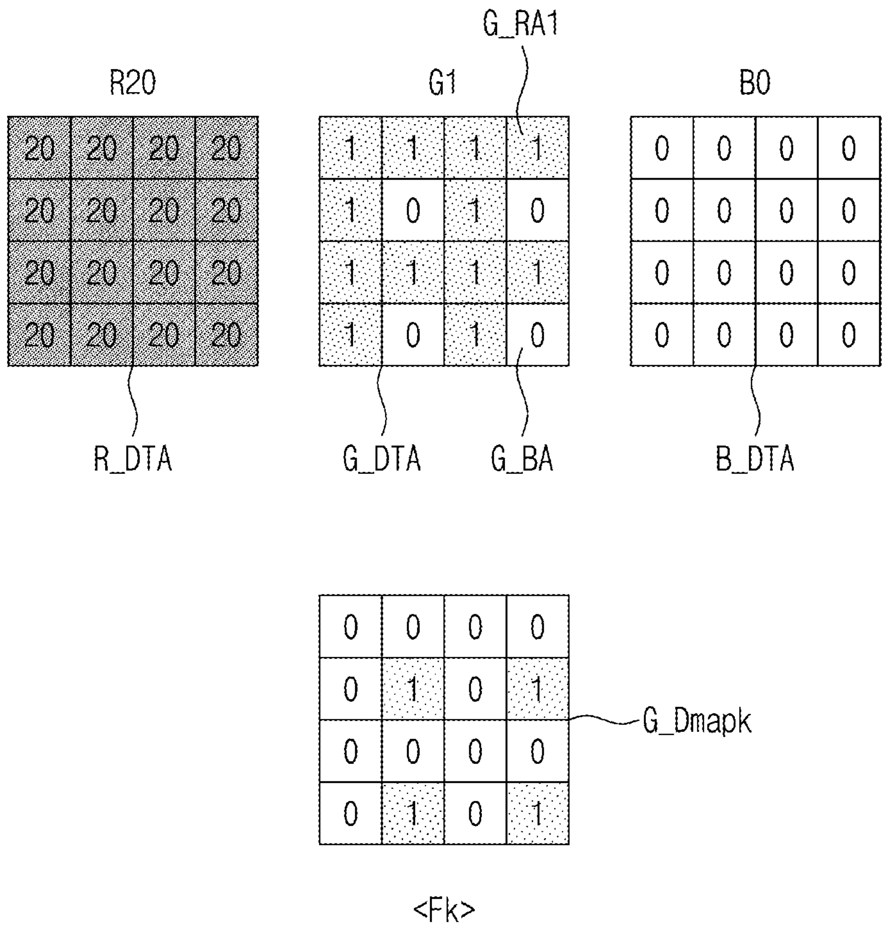
FIG. 16B is a diagram showing grayscales expressed in first red, first green, and first blue dithering areas during a k-th frame, according to an embodiment of the present disclosure.

FIG. 16A is a diagram showing grayscales expressed in first red, first green, and first blue dithering areas during a (k−1)-th frame, according to an embodiment of the present disclosure. FIG. 16B is a diagram showing grayscales expressed in first red, first green, and first blue dithering areas during a k-th frame, according to an embodiment of the present disclosure.

FIGS. 16A and 16B illustrate a case, in which a red target grayscale of the red dithering area R_DTA for red color is higher than a reference grayscale, and a green target grayscale of the green dithering area G_DTA for green color is lower than the reference grayscale, from among the second case that satisfies a mixed-color condition. The second dithering processing unit 140 is activated in the second case.

Referring to FIGS. 16A and 16B, the red target grayscale of the red dithering area R_DTA may be grayscale 20, and the green target grayscale of the green dithering area G_DTA may be grayscale 1. Here, the first reference grayscale may be grayscale 1. Because the red target grayscale R20 of the red dithering area R_DTA is higher than second reference grayscale 6, the red dithering area R_DTA is not included in the low-grayscale display area LGA (see FIG. 6), and thus a dithering operation is not applied to the red dithering area R_DTA. Because the green target grayscale G1 of the green dithering area G_DTA is equal to first reference grayscale 1, the green dithering area G_DTA is included in the low-grayscale display area LGA, and thus the first dithering operation is applied to the green dithering area G_DTA.

During the (k−1)-th frame Fk−1 (or referred to as a "previous frame"), the second dithering processing unit 140 expresses a (k−1)-th green dither pattern by applying the (k−1)-th green dithering map G_Dmapk−1 to the green dithering area G_DTA. During the (k−1)-th frame Fk−1, the green dithering area G_DTA includes the twelve first green reference grayscale areas G_RA1 with the first reference grayscale 1 and the four green black grayscale areas G_BA with the black grayscale 0.

During the k-th frame Fk (or referred to as a "current frame"), the second dithering processing unit 140 expresses a k-th green dither pattern by applying the k-th green dithering map G_Dmapk to the green dithering area G_DTA. During the k-th frame Fk, the green dithering area G_DTA includes the twelve first green reference grayscale areas G_RA1 with the first reference grayscale 1 and the four green black grayscale areas G_BA with the black grayscale 0.

The green light emitting element ED_G (see FIG. 13B) of the black grayscale area G_BA that expressed a black grayscale during the (k−1)-th frame Fk−1 is turned on during the k-th frame Fk. Charges accumulated in the pixel defining layer PDL (see FIG. 13B) around the red light emitting element ED_R (see FIG. 13B) may move to the green light emitting element ED_G, thereby causing overshoot in the green light Lg (see FIG. 13B) output from the green light emitting element ED_G. According to an embodiment of the present disclosure, during the k-th frame Fk, a data signal corresponding to the first reference grayscale 1 is applied to the green light emitting element ED_G. Accordingly, because the grayscale of green color is lower than the second reference grayscale 6 even when the luminance of the green light Lg increases due to the overshoot, a discoloration phenomenon that the green light Lg is perceived may be prevented.

FIGS. 16A and 16B depict a dithering process applied to different color areas in a display during successive frames. Specifically, the red dithering area R_DTA displays a red target grayscale of 20, which is above a specified reference and thus does not require dithering since it's not within the low-grayscale display area. Conversely, the green dithering area G_DTA matches the first reference grayscale of 1, situating it within the low-grayscale area and triggering the dithering operation. During the (k−1)-th frame, the green area undergoes dithering where twelve segments display the reference grayscale, and four segments display black. This configuration persists into the k-th frame. Additionally, any charge accumulation around the red light-emitting elements from the previous frame may induce overshoot in the green elements during the current frame, potentially increasing luminance. However, since the applied data signal matches the low reference grayscale, it prevents discoloration or perception issues despite the overshoot.

Figure 17A:
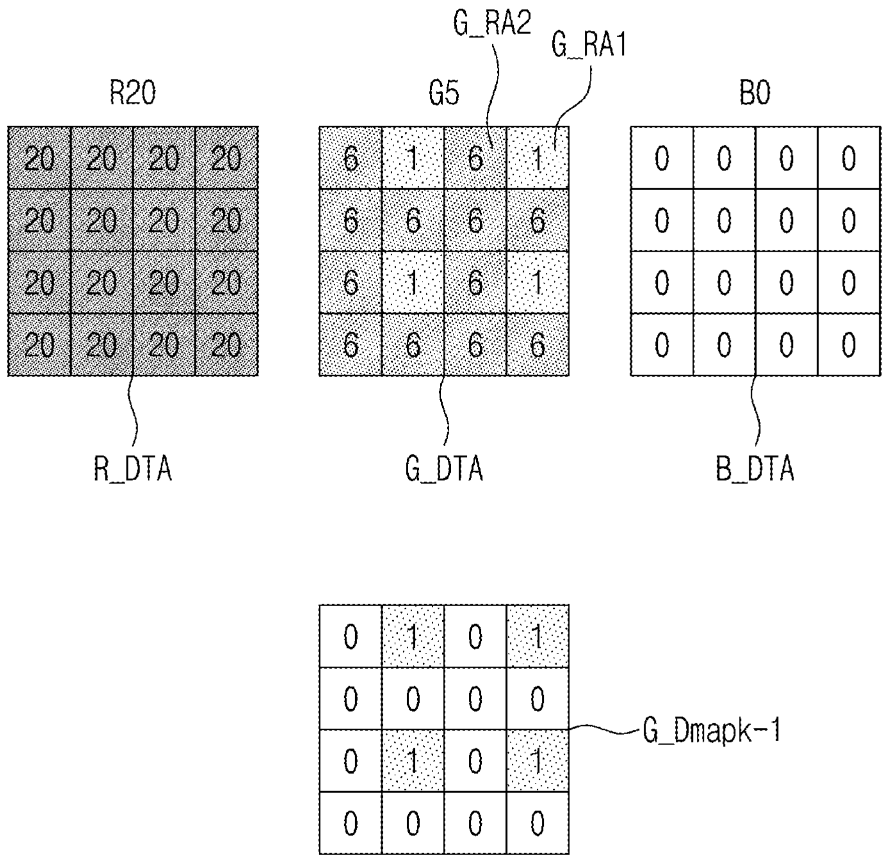
FIG. 17A is a diagram showing grayscales expressed in second red, second green, and second blue dithering areas during a (k−1)-th frame, according to an embodiment of the present disclosure.
Figure 17B:
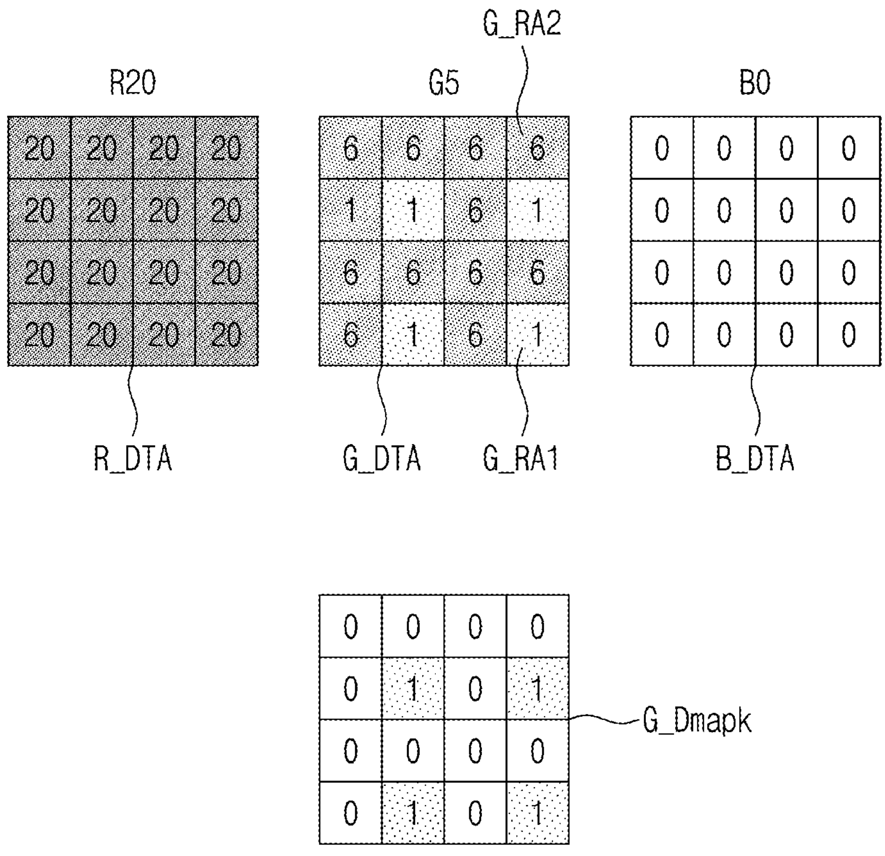
FIG. 17B is a diagram showing grayscales expressed in second red, second green, and second blue dithering areas during a k-th frame, according to an embodiment of the present disclosure.

FIG. 17A is a diagram showing grayscales expressed in second red, second green, and second blue dithering areas during a (k−1)-th frame, according to an embodiment of the present disclosure. FIG. 17B is a diagram showing grayscales expressed in second red, second green, and second blue dithering areas during a k-th frame, according to an embodiment of the present disclosure.

Referring to FIGS. 17A and 17B, the red target grayscale of the red dithering area R_DTA may be grayscale 20, and the green target grayscale of the green dithering area G_DTA may be grayscale 5. Here, a first reference grayscale may be grayscale 1, and a second reference grayscale may be grayscale 6. Because a green target grayscale G5 of the green dithering area G_DTA is lower than the second reference grayscale 6 and higher than the first reference grayscale 1, the green dithering area G_DTA is included in the low-grayscale display area LGA, and thus a second dithering operation is applied to the green dithering area G_DTA.

During the (k−1)-th frame Fk−1 (or referred to as a "previous frame"), the second dithering processing unit 140 expresses a (k−1)-th green dither pattern by applying the (k−1)-th green dithering map G_Dmapk−1 to the green dithering area G_DTA. During the (k−1)-th frame Fk−1, the green dithering area G_DTA includes twelve second green reference grayscale areas G_RA2 with the second reference grayscale 6, and four first green black grayscale areas G_RA1 with the first reference grayscale 1.

During the k-th frame Fk (or referred to as a "current frame"), the second dithering processing unit 140 expresses a k-th green dither pattern by applying the k-th green dithering map G_Dmapk to the green dithering area G_DTA. During the k-th frame Fk, the green dithering area G_DTA includes the twelve second green reference grayscale areas G_RA2 with the second reference grayscale 6 and the four first green reference grayscale area G_RA1 with the first reference grayscale 1.

When the second dithering operation is performed, the first green reference grayscale area G_RA1 expresses the first reference grayscale 1, which is higher than the black grayscale 0, during the (k−1)-th frame Fk−1. That is, when the second dithering operation is performed, none of the grayscale areas of the green dithering area G_DTA may be turned off. Accordingly, when the second dithering operation is performed, the green light emitting element ED_G (see FIG. 13B) may be turned on. As a result, charges accumulated in the pixel defining layer PDL (see FIG. 13B) around the red light emitting element ED_R (see FIG. 13B) may not move to the green light emitting element ED_G. Accordingly, the luminance of the green light Lg (see FIG. 13B) may be prevented from increasing due to overshoot.

FIGS. 17A and 17B detail the application of dithering techniques to manage color consistency and transitions in display devices across two frames. During the (k−1)-th frame, as shown in FIG. 17A, each of the color areas is carefully mapped out to include specific grayscales that are suitable for low-intensity display needs. The dithering process here involves segregating parts of each color's dithering area into segments that either match the reference grayscale or are set to black. Transitioning to the k-th frame, depicted in FIG. 17B, the previous configurations are largely maintained. This means that the segments previously set to a reference or black grayscale continue to hold their values. The advantage of maintaining such consistency between frames is may be useful for preventing the flickering or ghosting effects that can occur if the grayscales were adjusted too drastically between frames. By applying a consistent dithering map that gently modulates the intensity of colors, the display can produce smoother transitions and more stable visuals, especially in scenes where low-intensity colors are prevalent.

Figure 18:
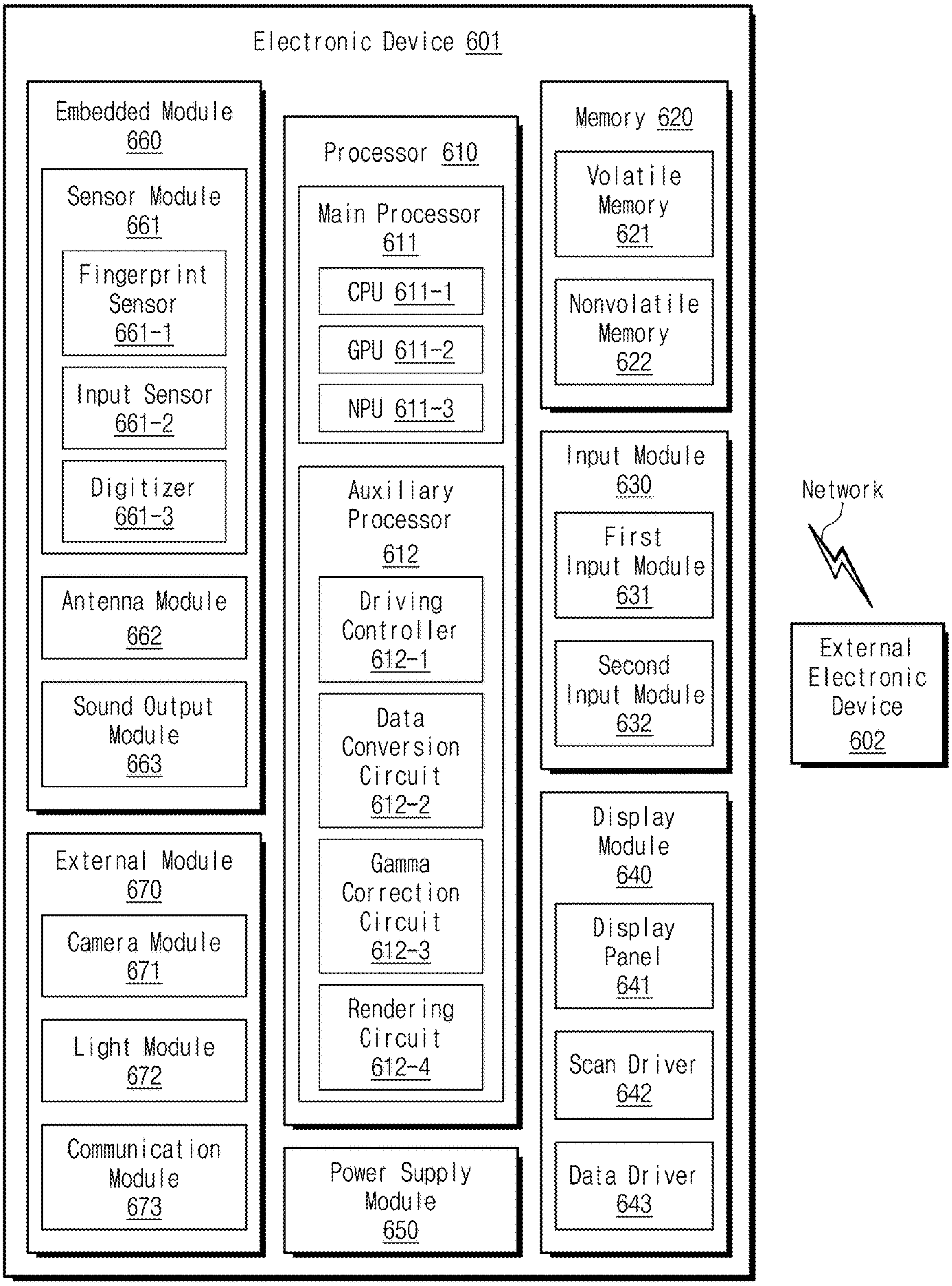
FIG. 18 is a block diagram of an electronic device, according to an embodiment of the present disclosure.

FIG. 18 is a block diagram of an electronic device, according to an embodiment of the present disclosure.

Referring to FIG. 18, an electronic device 601 outputs various pieces of information through a display module 640 within an operating system. When a processor 610 executes an application stored in a memory 620, a display module 640 provides application information to a user through a display panel 641.

The processor 610 obtains an external input through an input module 630 or a sensor module 661 and executes an application corresponding to the external input. For example, when the user selects a camera icon displayed on the display panel 641, the processor 610 obtains a user input through an input sensor 661-2 and activates a camera module 671. The processor 610 delivers image data corresponding to a captured image obtained through the camera module 671 to the display module 640. The display module 640 may display an image corresponding to the captured image through the display panel 641.

For another example, when personal information is authenticated on the display module 640, a fingerprint sensor 661-1 obtains entered fingerprint information as input data. The processor 610 compares input data obtained through the fingerprint sensor 661-1 with authentication data stored in the memory 620 and executes an application based on the comparison result. The display module 640 may display information, which is executed depending on the logic of the application, through the display panel 641.

For another example, when a music streaming icon displayed on the display module 640 is selected, the processor 610 obtains a user input through the input sensor 661-2 and activates the music streaming application stored in the memory 620. When a music play command is input by the music streaming application, the processor 610 provides sound information corresponding to the music play command to the user by activating a sound output module 663.

The operation of the electronic device 601 has been briefly described above. Hereinafter, a configuration of the electronic device 601 will be described in detail. Some of components of the electronic device 601, which will be described below, may be integrated and provided as one configuration, or the one configuration may be provided to be separated into two or more configurations.

Referring to FIG. 18, the electronic device 601 may communicate with an external electronic device 602 through a network (e.g., a short-range wireless communication network or a long-range wireless communication network). According to an embodiment, the electronic device 601 may include the processor 610, the memory 620, the input module 630, the display module 640, a power supply module 650, an embedded module 660, and an external module 670. According to an embodiment, in the electronic device 601, at least one of the above-described components may be omitted, or one or more other components may be added. According to an embodiment, some (e.g., the sensor module 661, an antenna module 662, or the sound output module 663) of the components described above may be integrated into another component (e.g., the display module 640).

The processor 610 may execute software to control at least another component (e.g., hardware or software component) of the electronic device 601 connected to the processor 610, and may process and calculate various types of data. According to an embodiment, as at least part of data processing or calculation, the processor 610 may store instructions or data received from other components (e.g., the input module 630, the sensor module 661 or a communication module 673) into a volatile memory 621, may process instructions or data stored in the volatile memory 621. The result data may be stored in a nonvolatile memory 622.

The processor 610 may include a main processor 611 and an auxiliary processor 612. The main processor 611 may include one or more of a central processing unit (CPU) 611-1 or an application processor (AP). The main processor 611 may further include one or more of a graphic processing unit (GPU) 611-2, a communication processor (CP), and an image signal processor (ISP). The main processor 611 may further include a neural processing unit (NPU) 611-3. The NPU 611-3 may be a processor that is specialized in processing an artificial intelligence model. The artificial intelligence model may be generated through machine learning. The artificial intelligence model may include a plurality of artificial neural network layers. The artificial neural network may be one of a deep neural network (DNN), a convolutional neural network (CNN), a recurrent neural network (RNN), a restricted Boltzmann machine (RBM), a deep belief network (DBN), a bidirectional recurrent deep neural network (BRDNN), a deep Q-network, or a combination of two or more of the networks, but is not limited to the above-described example. In addition to a hardware structure, additionally or alternatively, the artificial intelligence model may include a software structure. At least two of the processing units and the processors that are described above may be implemented as one integrated component (e.g., a single chip) or may be implemented as independent components (e.g., a plurality of chips).

The auxiliary processor 612 may include a driving controller 612-1. The driving controller 612-1 may include an interface converting circuit and a timing control circuit. The driving controller 612-1 receives an image signal from the main processor 611, converts the data format of the image signal so as to be suitable for the interface specifications with the display module 640, and outputs image data. The driving controller 612-1 may output various control signals required to drive the display module 640. The configuration of the driving controller 612-1 is substantially similar to the driving controller 100 shown in FIG. 3, and thus detailed descriptions are omitted to avoid redundancy.

The auxiliary processor 612 may further include a data converting circuit 612-2, a gamma correcting circuit 612-3, and a rendering circuit 612-4. The data converting circuit 612-2 may receive the image data from the driving controller 612-1 and may compensates for the image data such that an image is displayed at a desired luminance according to characteristics of the electronic device 601 or setting of the user or may convert the image data to reduce power consumption or compensate for afterimages. The gamma correcting circuit 612-3 may convert the image data, a gamma reference voltage, or the like such that the image displayed on the electronic device 601 has desired gamma characteristics. The rendering circuit 612-4 may receive the image data from the driving controller 612-1 and may render the image data in consideration of a pixel arrangement of the display panel 641 applied to the electronic device 601. At least one of the data converting circuit 612-2, the gamma correcting circuit 612-3, and the rendering circuit 612-4 may be integrated into another component (e.g., the main processor 611 or the driving controller 612-1). At least one of the data converting circuit 612-2, the gamma correcting circuit 612-3, and the rendering circuit 612-4 may be integrated into a data driver 643.

The memory 620 may store various pieces of data, which are used by at least one component (e.g., the processor 610 or the sensor module 661) of the electronic device 601 and input data or output data for commands related thereto. The memory 620 may include at least one or more of the volatile memory 621 and the nonvolatile memory 622.

The input module 630 may receive, from the outside (e.g., the user or an external electronic device 602) of the electronic device 601, commands or data to be used in a components (e.g., the processor 610, the sensor module 661, or the sound output module 663) of the electronic device 601.

The input module 630 may include a first input module 631, through which the commands or data are input from the user, and a second input module 632 through which the commands or data are input from the external electronic device 602. The first input module 631 may include a microphone, a mouse, a keyboard, a key (e.g., a button), or a pen (e.g., a passive pen or an active pen). The second input module 632 may support a designated protocol capable of being connected to the external electronic device 602 by wire or wirelessly. According to an embodiment, the second input module 632 may include a high definition multimedia interface (HDMI), a universal serial bus (USB) interface, a secure digital (SD) card interface, or an audio interface. The second input module 632 may include a connector that may be physically connected to the external electronic device 602, for example, an HDMI connector, a USB connector, an SD card connector, or an audio connector (e.g., a headphone connector).

The display module 640 provides visual information to the user. The display module 640 may include the display panel 641, a scan driver 642, and the data driver 643. The display module 640 may further include a window, a chassis, a bracket, or the like for protecting the display panel 641. The display module 640 may further include a light emitting driver, a voltage generator, and the like. The voltage generator may output various voltages (e.g., the first and second driving voltages ELVDD and ELVSS (see FIG. 3)) required to drive the display panel 641. The configuration of the display panel 641, the scan driver 642, the data driver 643, and the voltage generator is substantially similar to the configuration of the display panel DP, the scan driving circuit 300, the source driving circuit 200, and the voltage generator 400 shown in FIG. 3, and thus detailed descriptions are omitted to avoid redundancy.

The power supply module 650 supplies power to the components of the electronic device 601. The power supply module 650 may include a battery that charges a power voltage. The battery may include a non-rechargeable primary cell, a rechargeable secondary cell, a fuel cell, or the like. The power supply module 650 may include a power management integrated circuit (PMIC). The PMIC supplies optimized power to the above-described modules and modules which will be described below. The power supply module 650 may include a wireless power transmission/reception member electrically connected to the battery. The wireless power transmission/reception member may include a plurality of coil-shaped antenna radiators.

The electronic device 601 may further include the embedded module 660 and the external module 670. The embedded module 660 may include the sensor module 661, the antenna module 662, and the sound output module 663. The external module 670 may include the camera module 671, a light module 672, and the communication module 673.

The sensor module 661 may detect an input from the user's body or an input from a pen among the first input module 631, and may generate an electrical signal or data value corresponding to the input. The sensor module 661 may include at least one of the fingerprint sensor 661-1, the input sensor 661-2, and a digitizer 661-3.

The fingerprint sensor 661-1 may generate a data value corresponding to a fingerprint of the user. The fingerprint sensor 661-1 may include one of an optical-type fingerprint sensor, or a capacitance-type fingerprint sensor.

The input sensor 661-2 may generate a data value corresponding to coordinate information of an input by a body of the user or an input by a pen. The input sensor 661-2 generates the change in capacitance due to the input as the data value. The input sensor 661-2 may sense an input by a passive pen or may transmit or receive data to or from an active pen.

The input sensor 661-2 may also measure a biometric signal such as blood pressure, moisture, or body fat. For example, when the user touches a part of the body to a sensor layer or sensing panel and does not move during a specific period, the input sensor 661-2 may detect the biometric signal and may output information desired by the user to the display module 640 based on a changes in electric fields caused by the part of the body.

The digitizer 661-3 may generate the data value corresponding to coordinate information of an input by the pen. The digitizer 661-3 generates an electromagnetic change amount due to the input as the data value. The digitizer 661-3 may sense input by the passive pen or transmit or receive data to or from the active pen.

At least one of the fingerprint sensor 661-1, the input sensor 661-2, and the digitizer 661-3 may be implemented as a sensor layer formed on the display panel 641 through a subsequent process. The fingerprint sensor 661-1, the input sensor 661-2, and the digitizer 661-3 may be placed on the upper side of the display panel 641, and one (e.g., the digitizer 661-3) of the fingerprint sensor 661-1, the input sensor 661-2, and the digitizer 661-3 may be placed on the lower side of the display panel 641.

At least two or more of the fingerprint sensor 661-1, the input sensor 661-2, and the digitizer 661-3 may be formed to be integrated into one sensing panel through the same process. When being integrated into one sensing panel, the sensing panel may be placed between the display panel 641 and a window placed on the upper side of the display panel 641. According to an embodiment, the sensing panel may be placed on a window, and the location of the sensing panel is not particularly limited thereto.

At least one of the fingerprint sensor 661-1, the input sensor 661-2, and the digitizer 661-3 may be built into the display panel 641. That is, at least one of the fingerprint sensor 661-1, the input sensor 661-2, and the digitizer 661-3 may be simultaneously formed through a process of forming elements (e.g., a light emitting element, a transistor, or the like) included in the display panel 641.

Besides, the sensor module 661 may generate an electrical signal or a data value corresponding to the internal state or external state of the electronic device 601. For example, the sensor module 661 may further include a gesture sensor, a gyro sensor, a barometric pressure sensor, a magnetic sensor, an acceleration sensor, a grip sensor, a proximity sensor, a color sensor, an infrared (IR) sensor, a biometric sensor, a temperature sensor, a humidity sensor, or an illumination sensor.

The antenna module 662 may include one or more antennas to transmit or receive the signal or power to or from an external source. According to an embodiment, the communication module 673 may transmit or receive the signal to or from the external electronic device through the antenna suitable for a communication method. An antenna pattern of the antenna module 662 may be integrated into the input sensor 661-2 or one component (e.g., the display panel 641) of the display module 640.

The audio output module 663 may be a device for outputting an audio signal to the outside of the electronic device 601 and, for example, may include a speaker used for general purposes, such as multimedia playback or recording playback, and a receiver used only for receiving a call. According to an embodiment, the receiver may be implemented separately from the speaker or may be integrated with the speaker. A sound output pattern of the sound output module 663 may be integrated into the display module 640.

The camera module 671 may shoot a still image or a video image. According to an embodiment, the camera module 671 may include one or more lenses, an image sensor, or an image signal processor. The camera module 671 may further include an infrared camera capable of measuring the presence or absence of the user, a position of the user, a gaze of the user, or the like.

The light module 672 may provide light. The light module 672 may include a light emitting diode or a xenon lamp. The light module 672 may operate in conjunction with the camera module 671 or may operate independently from the camera module 1710.

The communication module 673 may support establishing a wired or wireless communication channel between the electronic device 601 and the external electronic device 602 and performing communication through the established communication channel. The communication module 673 may include one or all of wireless communication modules such as a cellular communication module, a short-range wireless communication module, or a global navigation satellite system (GNSS) communication module, or wired communication modules such as a local area network (LAN) communication module or a power line communication module. The communication module 673 may communicate with the external electronic device 602 through a short-range communication network such as Bluetooth, WiFi direct, or infrared data association (IrDA) or a long-range communication network such as a cellular network, Internet, or a computer network (e.g., the LAN or a wide area network (WAN)). The above-mentioned various communication modules 673 may be implemented into one chip or may be respectively implemented into separate chips.

The input module 630, the sensor module 661, the camera module 671, and the like may be utilized to control an operation of the display panel 640 in conjunction with the processor 610.

The processor 610 outputs commands or data to the display module 640, the sound output module 663, the camera module 671, or the light module 672 based on input data received from the input module 630. For example, the processor 610 may generate image data in response to input data applied through a mouse, an active pen, or the like to output the generated image data to the display module 640 or may generate command data in response to the input data to output the generated command data to the camera module 671 or the light module 672. When no input data is received from the input module 630 during a specific period, the processor 610 may switch an operation mode of the electronic device 601 to a low-power mode or a sleep mode to reduce power consumed in the electronic device 601.

The processor 610 outputs commands or data to the display module 640, the sound output module 663, the camera module 671, or the light module 672 based on sensing data received from the sensor module 661. For example, the processor 610 may compare authentication data authorized by the fingerprint sensor 661-1 with the authentication data stored in the memory 620, and then may execute an application depending on the comparison result. The processor 610 may execute commands or may output corresponding image data to the display module 640 based on sensing data sensed by the input sensor 661-2 or the digitizer 661-3. When the sensor module 661 includes a temperature sensor, the processor 610 receives temperature data regarding the measured temperature from the sensor module 661 and may further perform luminance correction on image data based on the temperature data.

The processor 610 may receive measurement data regarding the presence or absence of the user, the user's location, and the user's gaze from the camera module 671. The processor 610 may further perform luminance correction on the image data based on the measurement data. For example, the processor 610 that determines the presence or absence of the user through an input from the camera module 671 may output image data, of which the luminance is corrected, to the display module 640 through the data converting circuit 612-2 or the gamma correcting circuit 612-3.

Some of the components may be connected to each other through communication methods between peripheral devices, for example, a bus, a general purpose input/output (GPIO), a serial peripheral interface (SPI), a mobile industry processor interface (MIPI), or an ultra-path interconnect (UPI) link and may exchange a signal (e.g., commands or data) between each other. The processor 610 may communicate with the display module 640 through a mutually promised interface, and for example, may use any one of the above-described communication methods, and the present disclosure is not limited to the above-described communication methods.

The electronic device 601 according to various embodiments disclosed in the specification may be implemented with various types of devices. The electronic device 601 may include, for example, at least one of a portable communication device (e.g., a smart phone), a computer device, a portable multimedia device, a portable medical device, a camera, a wearable device, or a home appliance. The electronic device 601 according to an embodiment of this specification may not be limited to the above-described devices.

Although various embodiments of the present disclosure have been described for illustrative purposes, those skilled in the art will appreciate that various modifications, and substitutions are possible, without departing from the scope and spirit of the present disclosure as disclosed in the accompanying claims. Accordingly, the technical scope of the present disclosure is not limited to the detailed description of this specification.

According to an embodiment of the present disclosure, when a grayscale area, which expressed black grayscale during a previous frame, immediately displays a reference grayscale during a current frame, overshoot may occur, and thus an offset grayscale lower than the reference grayscale may be applied to the corresponding grayscale area. Accordingly, a discoloration phenomenon where light of a specific color is perceived may not occur even though the overshoot occurs in the corresponding grayscale area during the current frame, thereby enhancing the display quality of a low grayscale display area.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. A display device comprising:

a driving controller configured to:

compare a target grayscale of a dithering area within image data with a reference grayscale;

adjust the image data using the reference grayscale and dithering maps when a result of the compare indicates the target grayscale is lower than the reference grayscale;

apply an offset grayscale to a first grayscale area during a current frame, which displayed a black grayscale in a previous frame, wherein the offset grayscale is lower than the reference grayscale and higher than the black grayscale; and apply the black grayscale or the reference grayscale to a second grayscale area during the current frame, which displayed the reference grayscale during the previous frame;

a source driving circuit configured to convert the image data into data signals; and a display panel configured to receive the data signals to display an image.

2. The display device of claim 1, wherein the driving controller is configured to:

receive a red input image signal, a green input image signal, and a blue input image signal, and wherein the dithering area is set for a red color of the red input image signal, a green color of the green input image signal, and a blue color of the blue input image signal.

3. The display device of claim 2, wherein the driving controller includes:

a low-grayscale determining unit configured to compare the target grayscale with the reference grayscale to determine whether the target grayscale is lower than the reference grayscale;

a mixed-color determining unit configured to determine whether a mixed-color condition is satisfied, by using the red input image signal, the green input image signal, and the blue input image signal;

a first dithering processing unit activated when the mixed-color condition is not satisfied; and a second dithering processing unit activated when the mixed-color condition is satisfied.

4. The display device of claim 3, wherein the first dithering processing unit is configured to:

apply the reference grayscale to the first grayscale area during the current frame; and apply the black grayscale or the reference grayscale to the second grayscale area during the current frame, and wherein the second dithering processing unit is configured to:

apply the offset grayscale to the first grayscale area during the current frame; and apply the black grayscale or the reference grayscale to the second grayscale area during the current frame.

5. The display device of claim 3, wherein the mixed-color condition is a condition that at least two input image signals among the red input image signal, the green input image signal, and the blue input image signal do not have the black grayscale, and two input image signals among the red input image signal, the green input image signal, and the blue input image signal do not have a grayscale the same as each other.

6. The display device of claim 3, wherein when a red target grayscale of a red dithering area for the red color is higher than the reference grayscale, and a green target grayscale of a green dithering area for the green color is lower than the reference grayscale, the driving controller is configured to:

apply a green offset grayscale during the current frame to a first green grayscale area, which expresses the black grayscale during the previous frame, from among a plurality of green grayscale areas included in the green dithering area; and apply the black grayscale or the reference grayscale during the current frame to a second green grayscale area, which expresses the reference grayscale during the previous frame, from among the plurality of green grayscale areas.

7. The display device of claim 3, wherein when a red target grayscale of a red dithering area for the red color is lower than the reference grayscale, and a green target grayscale of a green dithering area for the green color is lower than the reference grayscale, the driving controller is configured to:

apply a red offset grayscale during the current frame to a first red grayscale area, which expresses the black grayscale during the previous frame, from among a plurality of red grayscale areas included in the red dithering area;

apply the black grayscale or the reference grayscale during the current frame to a second red grayscale area, which expresses the reference grayscale during the previous frame, from among the plurality of red grayscale areas;

apply a green offset grayscale during the current frame to a first green grayscale area, which expresses the black grayscale during the previous frame, from among a plurality of green grayscale areas included in the green dithering area; and apply the black grayscale or the reference grayscale during the current frame to a second green grayscale area, which expresses the reference grayscale during the previous frame, from among the plurality of green grayscale areas.

8. The display device of claim 7, wherein the green offset grayscale is equal to the red offset grayscale.

9. The display device of claim 1, wherein each of the dithering maps includes dithering bits respectively corresponding to the grayscale areas included in the dithering area, wherein a first dithering bit for the first grayscale area has an inactive state during the previous frame and has an active state during the current frame, and wherein a second dithering bit for the second grayscale area has an active state during the previous frame and an active or inactive state during the current frame.

10. The display device of claim 9, wherein the driving controller is configured to:

allow the dithering area to express the target grayscale by applying a different dithering map for each frame during a predetermined number of frames, and wherein a number of the dithering bits having the active state in the respective dithering map is set depending on the target grayscale.

11. The display device of claim 1, wherein the display panel includes a plurality of pixels, wherein each of the plurality of pixels includes a light emitting element, and wherein light emitting elements of the plurality of pixels share a cathode electrode.

12. The display device of claim 11, wherein the plurality of pixels include a red pixel, a green pixel, and a blue pixel, and wherein the green pixel is adjacent to the red pixel and the blue pixel.

13. A display device comprising:

a driving controller configured to receive image data to output adjusted image data;

a source driving circuit configured to convert the adjusted image data into data signals; and a display panel configured to receive the data signals to display an image, wherein the driving controller is configured to:

compare a target grayscale of a dithering area within the image data with a first reference grayscale and a second reference grayscale;

adjust the image data using the first reference grayscale and first dithering maps when a result of the compare indicated the target grayscale is lower than the first reference grayscale; and adjust the image data using the first reference grayscale, the second reference grayscale, and second dithering maps when a result of the compare indicates the target grayscale is higher than or equal to the first reference grayscale and lower than or equal to the second reference grayscale.

14. The display device of claim 13, wherein the driving controller is configured to:

receive a red input image signal, a green input image signal, and a blue input image signal, and wherein the dithering area is set for a red color of the red input image signal, a green color of the green input image signal, and a blue color of the blue input image signal.

15. The display device of claim 14, wherein the driving controller further includes:

a low-grayscale determining unit configured to compare the target grayscale with the first reference grayscale and the second reference grayscale to determine whether the target grayscale is lower than the first reference grayscale;

a mixed-color determining unit configured to determine whether a mixed-color condition is satisfied, by using the red input image signal, the green input image signal, and the blue input image signal;

a first dithering processing unit activated when the mixed-color condition is not satisfied; and a second dithering processing unit activated when the mixed-color condition is satisfied.

16. The display device of claim 15, wherein the first dithering processing unit expresses the target grayscale by applying a black grayscale or the second reference grayscale to a plurality of grayscale areas included in the dithering area, and wherein the second dithering processing unit is configured to:

express the target grayscale by applying the black grayscale or the first reference grayscale to the plurality of grayscale areas when the target grayscale is present between the black grayscale and the first reference grayscale; and express the target grayscale by applying the first reference grayscale or the second reference grayscale to the plurality of grayscale areas when the target grayscale is present between the first reference grayscale and the second reference grayscale.

17. The display device of claim 16, wherein the mixed-color condition satisfies a condition that at least two input image signals among the red input image signal, the green input image signal, and the blue input image signals do not have the black grayscale, and two input image signals among the red input image signal, the green input image signal, and the blue input image signals do not have a grayscale the same as each other.

18. The display device of claim 16, wherein when a red target grayscale of a red dithering area for the red color is higher than the second reference grayscale, and a green target grayscale of a green dithering area for the green color is between the black grayscale and the first reference grayscale, the driving controller is configured to:

among a plurality of green grayscale areas included in the green dithering area, apply the black grayscale to a green black grayscale area and apply the first reference grayscale to a first green reference grayscale area, and wherein when the red target grayscale of the red dithering area for the red color is higher than the second reference grayscale, and the green target grayscale of the green dithering area for the green color is between the first reference grayscale and the second reference grayscale, the driving controller is configured to:

among the plurality of green grayscale areas included in the green dithering area, apply the first reference grayscale to the first green reference grayscale area, and apply the second reference grayscale to a second green reference grayscale area.

19. The display device of claim 13, wherein the display panel includes a plurality of pixels, wherein each of the plurality of pixels includes a light emitting element, wherein light emitting elements of the plurality of pixels share a cathode electrode, wherein the plurality of pixels include a red pixel, a green pixel, and a blue pixel, and wherein the green pixel is adjacent to the red pixel and the blue pixel.

20. An electronic device comprising:

a driving controller configured to:

receive image data;

compare a target grayscale of a dithering area within the image data with a reference grayscale;

adjust the image data using the reference grayscale and dithering maps when a result of compare indicates the target grayscale is lower than the reference grayscale;

apply an offset grayscale to a first grayscale area during a current frame, which expresses a black grayscale during a previous frame, wherein the offset grayscale is lower than the reference grayscale and higher than the black grayscale; and apply the black grayscale or the reference grayscale to a second grayscale area during the current frame, which expresses the reference grayscale during the previous frame;

a source driving circuit configured to convert the image data into data signals;

a display panel configured to receive the data signals to display an image; and a processor configured to provide the image data to the driving controller.

* * * * *